(12) United States Patent
Jones et al.

(10) Patent No.: US 10,492,501 B2
(45) Date of Patent: Dec. 3, 2019

(54) PORTABLE STUNNER

(71) Applicant: Jarvis Products Corporation, Middletown, CT (US)

(72) Inventors: Arthur Jones, Tabor, IA (US); Trent Jones, Tabor, IA (US)

(73) Assignee: JARVIS PRODUCTS CORPORATION, Middletown, CT (US)

( * ) Notice: Subject to any disclaimer, the term of this patent is extended or adjusted under 35 U.S.C. 154(b) by 0 days.

(21) Appl. No.: 16/366,439

(22) Filed: Mar. 27, 2019

(65) Prior Publication Data

US 2019/0216104 A1    Jul. 18, 2019

Related U.S. Application Data

(63) Continuation of application No. 15/857,029, filed on Dec. 28, 2017, now Pat. No. 10,299,486.

(60) Provisional application No. 62/464,436, filed on Feb. 28, 2017.

(51) Int. Cl.
*A22B 3/00* (2006.01)
*A22B 3/02* (2006.01)
*G05D 16/04* (2006.01)

(52) U.S. Cl.
CPC .............. *A22B 3/02* (2013.01); *G05D 16/04* (2013.01)

(58) Field of Classification Search
CPC .............. A22B 3/00; A22B 3/005; A22B 3/02
USPC ..... 452/57, 62, 63; 42/1.14, 1.12, 52, 44, 64
See application file for complete search history.

(56) References Cited

U.S. PATENT DOCUMENTS

| | | | |
|---|---|---|---|
| 4,086,682 A | 5/1978 | Hancox | |
| 4,219,905 A * | 9/1980 | Thacker | A22B 3/02 452/62 |
| 4,446,599 A * | 5/1984 | Karubian | A22B 3/02 452/62 |
| 4,503,585 A * | 3/1985 | Hamel | A22B 3/02 227/130 |
| 4,575,900 A * | 3/1986 | Hamel | A22B 3/02 227/130 |
| 5,692,951 A * | 12/1997 | Huff | A22B 3/02 452/57 |
| 6,135,871 A * | 10/2000 | Jones | A22B 3/02 173/114 |
| 6,170,477 B1 * | 1/2001 | Horlock | F41B 11/83 124/61 |
| 2003/0171085 A1 | 9/2003 | Bass | |

(Continued)

*Primary Examiner* — Richard T Price, Jr.
(74) *Attorney, Agent, or Firm* — DeLio Peterson & Curcio LLC; Peter W. Peterson

(57) ABSTRACT

A portable pneumatic stunner for stunning or euthanizing an animal has a piston slideable within an inner chamber, a housing with a front portion being moveable toward and away from its rear portion, a stunning rod driven by the piston forward towards the front end of the housing, a catch system for alternately holding and releasing the stunning rod, and a regulator for regulating the pressure received from a fluid container for operating the stunner. The stunning rod is driven along a longitudinal axis upon exposure of a pressurized fluid to the piston, and the stunning rod is retracted back into the stunner after firing by exerting a manual inward force on the stunning rod and housing. The catch system comprises a plurality of arcuate sections substantially forming a cylinder. The regulator determines the allowable pressure levels of the fluid the stunner is subjected to.

33 Claims, 16 Drawing Sheets

(56) References Cited

U.S. PATENT DOCUMENTS

2004/0209562 A1* 10/2004 Jones .................. A22B 3/02
452/62
2013/0023190 A1 1/2013 Evans
2014/0273781 A1 9/2014 Bock

* cited by examiner

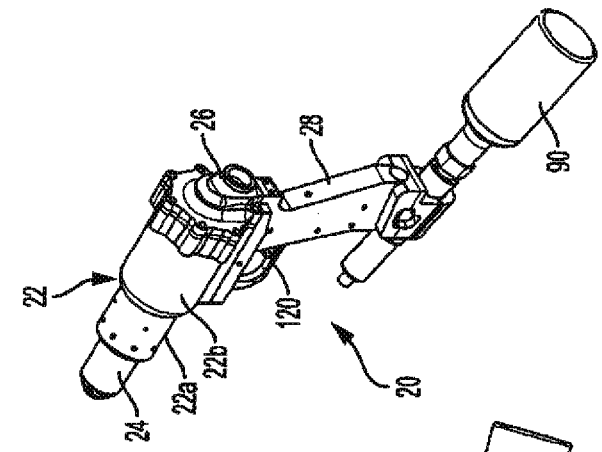
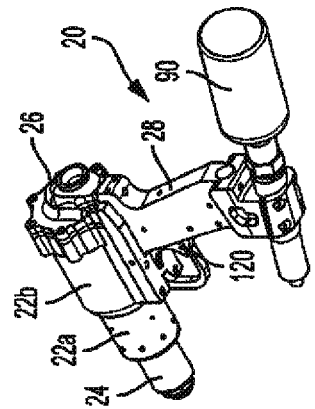
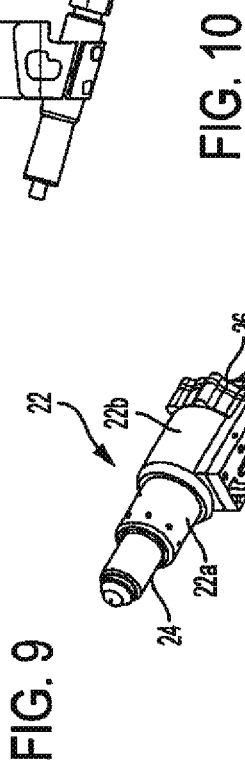
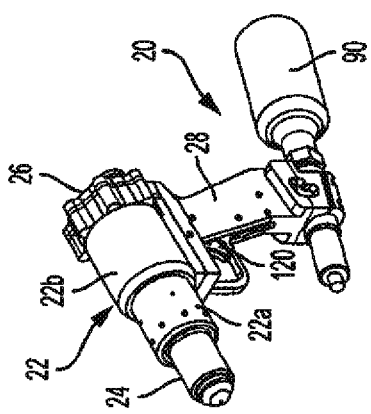
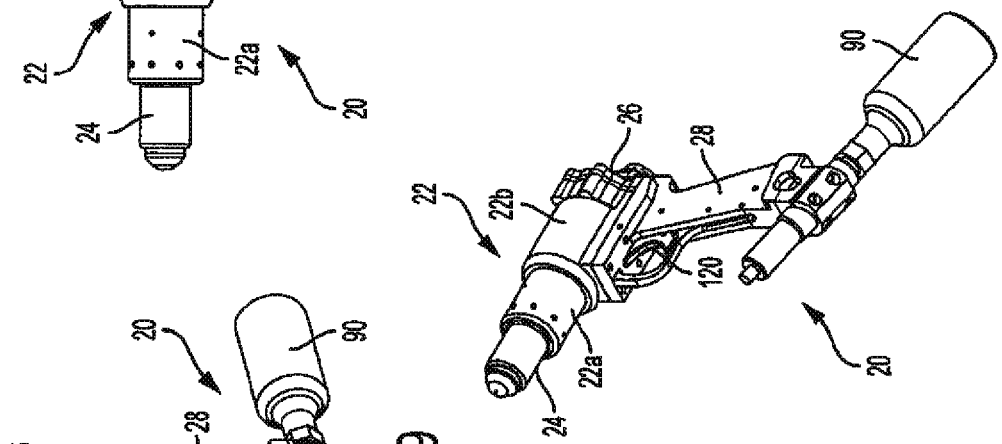

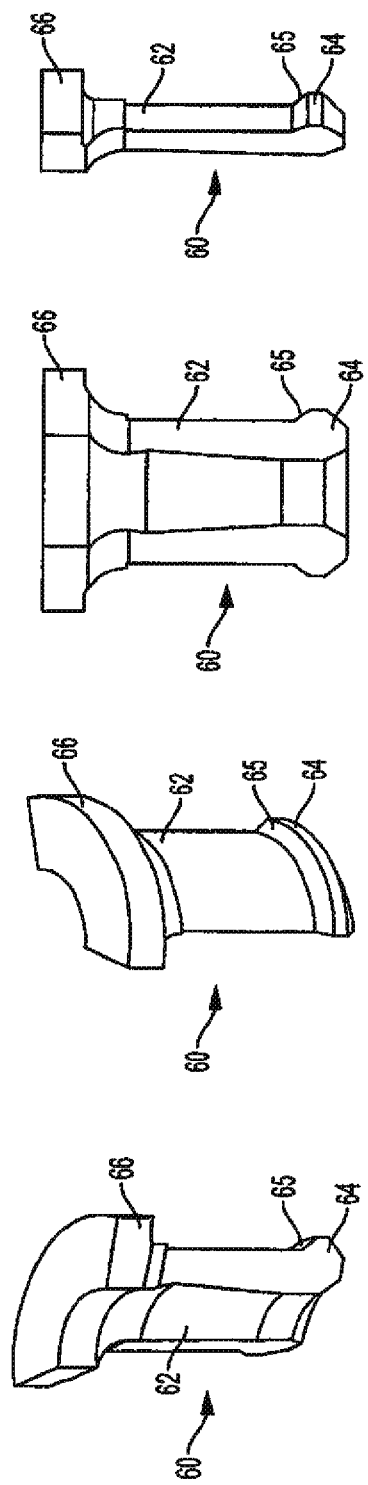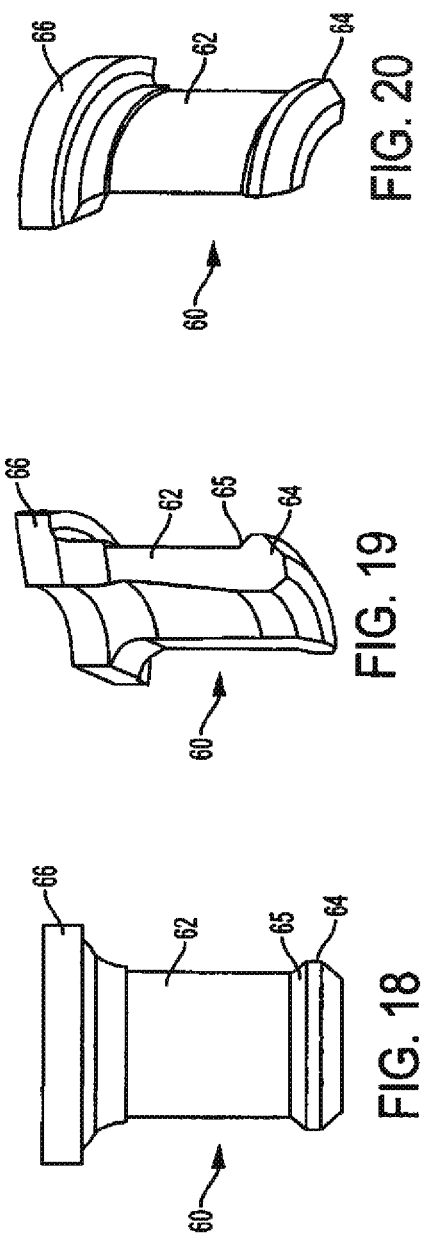

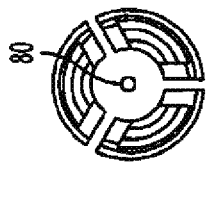
FIG. 24
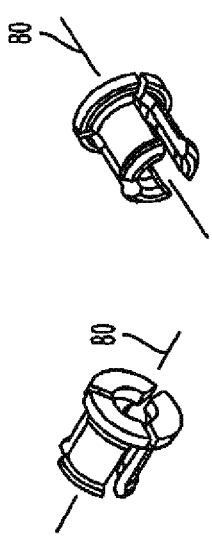
FIG. 23
FIG. 22
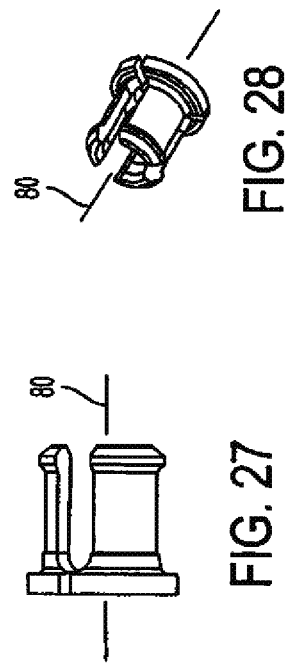
FIG. 28
FIG. 27
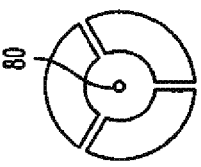
FIG. 26
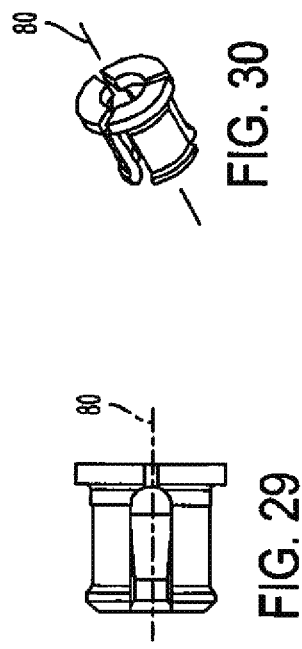
FIG. 30
FIG. 29
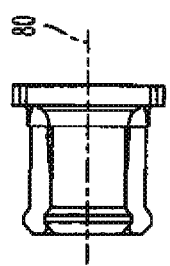
FIG. 21
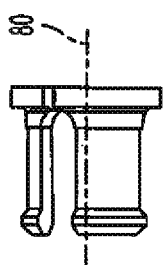
FIG. 25

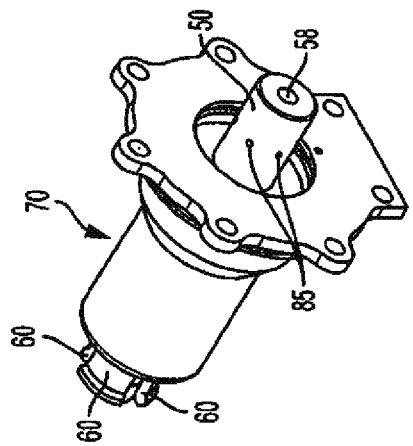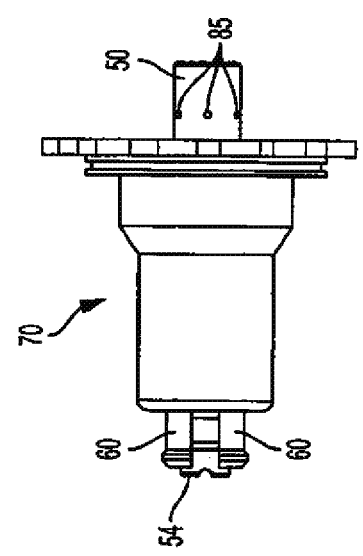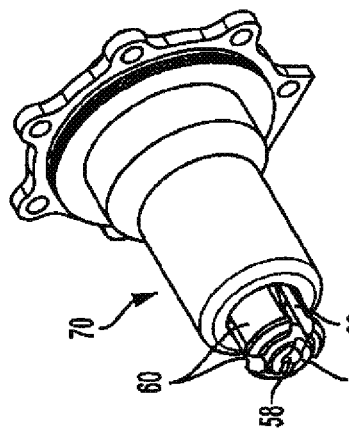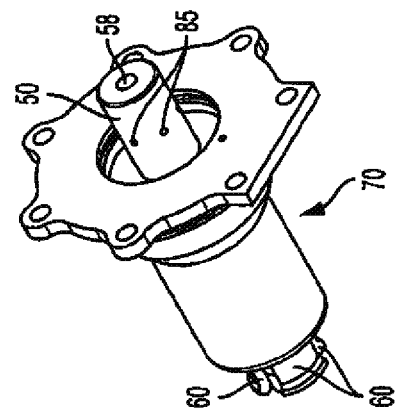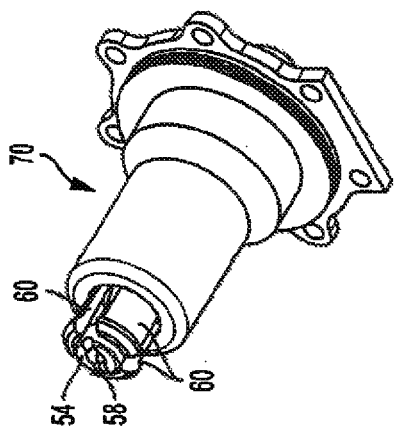

PORTABLE STUNNER

BACKGROUND OF THE INVENTION

1. Field of the Invention

This invention relates in general to a pneumatic animal stunner used in livestock/slaughterhouse operations, and more specifically to a portable stunner with a catch system for holding and releasing the stunning rod, a compressed fluid supply used to extend the stunning rod between operation cycles, a housing structure that allows for stunning rod retraction by manual force, a regulator for controlling the amount of pressure exerted by the compressed fluid supply, and a valve system to control flow of the pressurized fluid between a fluid tank and a pressure chamber.

2. Description of Related Art

In livestock production plants, it is important to stun and disable an animal for processing. In livestock production farms, it is important to euthanize animals suffering from severe injury or irreversible disease so as to prevent the spread of illness. Although numerous methods have been used to stun and euthanize livestock, captive bolt mechanisms have proven to be the most efficient, inexpensive, and humane way to disable the animal. Particularly, pneumatic captive bolt devices have been used in this capacity.

The catch and other components of such prior designs are subject to sliding engagement with other components during operation. This results in interference, breakdown, and overall wear, which in turn creates drag between components and improper execution of animal stunning operations. Such damage requires periodic replacement of catch components to ensure consistency in operation of captive bolt mechanisms.

Compressed fluids and their containers used by prior art captive bolt mechanisms also present an issue, as excess fluid volume is typically needed for each stunning cycle thus increasing the costs of operation due to wasted resources. Portability of these captive bolt mechanisms are also hindered due to larger fluid supply tanks.

SUMMARY OF THE INVENTION

Bearing in mind the problems and deficiencies of the prior art, it is an object of the present invention to provide a pneumatic animal stunner and method of operation thereof, as described below and in the appended claims.

It is another object of the present invention to provide a pneumatic animal stunner with a fluid pressure regulator for controlling the fluid pressure levels needed to operate the stunner.

Still other objects and advantages of the invention will in part be obvious and will in part be apparent from the specification.

The above and other objects, which will be apparent to those skilled in the art, are achieved in the present invention which is directed to a pneumatic animal stunner for stunning an animal comprising a housing having a front end, a stunning rod having a rear end portion, a catch, and a catch piston. The stunning rod is within the housing and is capable of being driven forward along a longitudinal axis towards the front end of the housing. The catch is mounted within the housing for alternately holding and releasing the stunning rod, and is pivotally mounted for moving a forward end portion inward and outward toward and away from the longitudinal axis. The catch forward end portion is moveable between a hold position contacting the rod rear end portion away from the longitudinal axis preventing the stunning rod from being driven forward, and a release position toward the stunning rod longitudinal axis permitting the stunning rod to be driven forward. The catch piston is disposed adjacent the catch and in sliding contact therewith. The catch piston is adapted to slide in the direction of the longitudinal axis between a first position urging the catch forward end portion outward away from the stunning rod longitudinal axis in the hold position, thereby holding and preventing the stunning rod from being driven forward, and a second position permitting the catch forward end portion to move to the release position inward toward the stunning rod longitudinal axis releasing and permitting the stunning rod to be driven forward to stun the animal.

In an embodiment, the stunning rod has an opening in the rear end portion, and the catch forward end portion extends into the rod rear end portion opening to hold and prevent the stunning rod from being driven forward. The catch forward end portion may have an outwardly extending flange for engaging a periphery of the stunning rod opening to hold and prevent the stunning rod from being driven forward. The catch piston may extend along the longitudinal axis between the catch and the longitudinal axis, with the catch piston being slideable between a rearward position urging the catch forward end portion flange outward into engagement with the stunning rod opening periphery, and a forward position permitting the catch forward end portion flange to move inward to the release position. The stunning rod may further be moveable rearward to contact a forward end of the catch piston and slide the catch piston to the rearward position urging the catch forward end portion flange outward into engagement with the stunning rod opening periphery to hold and prevent the stunning rod from being driven forward. A plurality of catches may be arranged about the longitudinal axis, with each catch having an outwardly extending flange on a forward end portion, and wherein the catch piston forward end is within the catches and has a first diameter sufficient to contact and urge catch forward end portion flanges outward into engagement with the stunning rod opening periphery when the catch piston is in the rearward position. The catch piston may further have a relief portion rearward of the forward end with a second diameter smaller than the first diameter, the relief portion second diameter being sufficient to permit catch forward end portion flanges to move inward to the release position, out of engagement with the stunning rod opening periphery, when the catch piston is in the forward position. Even further, each catch may have a rearward end portion and the catch piston has a body portion slidingly contacting the catch rearward end portions, and further including a catch retainer extending around and securing the rearward end portions, to permit each of the catch forward end portion flanges to pivot inward and outward toward and away from the longitudinal axis. Each catch may have an outwardly extending flange at the catch rearward end and the catch retainer has an inwardly facing groove, and wherein the catch outwardly extending flanges are received in the retainer inwardly facing groove top to permit the catch forward end portion flanges to pivot inward and outward. Still further, each catch may have an arcuate body curved about the longitudinal axis.

In another aspect, the present invention is directed to a method of stunning an animal. The method provides a pneumatic animal stunner for stunning an animal comprising a housing having a front end, a stunning rod having a rear end portion, a catch, and a catch piston. The stunning rod is within the housing and is capable of being driven forward along a longitudinal axis towards the front end of the housing. The catch is mounted within the housing for alternately holding and releasing the stunning rod, and is pivotally mounted for moving a forward end portion inward and outward toward and away from the longitudinal axis. The catch forward end portion is moveable between a hold position contacting the rod rear end portion away from the longitudinal axis preventing the stunning rod from being driven forward, and a release position toward the stunning rod longitudinal axis permitting the stunning rod to be driven forward. The catch piston is disposed adjacent the catch and in sliding contact therewith. The catch piston is adapted to slide in the direction of the longitudinal axis between a first position urging the catch forward end portion outward away from the stunning rod longitudinal axis in the hold position, thereby holding and preventing the stunning rod from being driven forward, and a second position permitting the catch forward end portion to move to the release position inward toward the stunning rod longitudinal axis releasing and permitting the stunning rod to be driven forward to stun the animal. The method includes the steps of sliding the catch piston in the direction of the longitudinal axis to a first position urging the catch forward end portion outward away from the stunning rod longitudinal axis in the hold position, thereby holding and preventing the stunning rod from being driven forward, and sliding the catch piston in the direction of the longitudinal axis to a second position permitting the catch forward end portion to move to the release position inward toward the stunning rod longitudinal axis releasing and permitting the stunning rod to be driven forward to stun the animal.

In yet another aspect, the present invention is directed to a pneumatic animal stunner for stunning an animal comprising a housing having a front end, a stunning rod having a rear end portion, and a catch. The stunning rod is within the housing and is capable of being driven forward along a longitudinal axis towards the front end of the housing. The catch is mounted within the housing for alternately holding and releasing the stunning rod, and has a forward end portion extending into the rod rear end portion. The catch forward end portion is moveable between a hold position contacting the rod rear end portion preventing the stunning rod from being driven forward and a release position permitting the stunning rod to be driven forward to stun the animal.

In an embodiment, the catch forward end portion may have an outwardly extending flange for engaging a periphery of the stunning rod opening to hold and prevent the stunning rod from being driven forward.

In still another aspect, the present invention is directed to a method of stunning an animal. The method provides a pneumatic animal stunner for stunning an animal comprising a housing having a front end, a stunning rod having a rear end portion, and a catch. The stunning rod is within the housing and is capable of being driven forward along a longitudinal axis towards the front end of the housing. The catch is mounted within the housing for alternately holding and releasing the stunning rod, and has a forward end portion extending into the rod rear end portion. The catch forward end portion is moveable between a hold position contacting the rod rear end portion preventing the stunning rod from being driven forward and a release position permitting the stunning rod to be driven forward to stun the animal. The method steps include moving the catch forward end portion to a hold position contacting the rod rear end portion preventing the stunning rod from being driven forward, and moving the catch forward end portion to a release position permitting the stunning rod to be driven forward to stun the animal.

In a further aspect, the present invention is directed to a pneumatic animal stunner for stunning an animal comprising a housing having a front end, a stunning rod having a rear end portion, a catch, a catch piston, a pressure chamber for supplying a pressurized fluid to drive the stunning rod forward, a passageway between a source of pressurized fluid and the pressure chamber, and a first valve. The stunning rod is within the housing and is capable of being driven forward along a longitudinal axis towards the front end of the housing. The catch is mounted within the housing for alternately holding and releasing the stunning rod. The catch piston is disposed adjacent the catch and in sliding contact therewith. The catch piston is adapted to move between a first position urging the catch to hold and prevent the stunning rod from being driven forward, and a second position releasing the catch to permit the stunning rod to be driven forward. The passageway is open to permit the pressurized fluid to flow into the pressure chamber when the catch piston is in the first position and closed to prevent the pressurized fluid from flowing into the pressure chamber when the catch piston is in the second position. The first valve in the passageway is operable to control the flow of pressurized fluid from the source. When the catch piston is in the first position urging the catch to hold and prevent the stunning rod from being driven forward, the operation of the first valve permits pressurized fluid to flow from the source into the pressure chamber, and when the catch piston is in the second position releasing the catch, operation of the first valve does not permit pressurized fluid to flow from the source into the pressure chamber.

In an embodiment, pressurized fluid is exhausted from the pressure chamber preventing the stunning rod from being driven forward upon release of the first valve. A second valve may be further included, which is operable to control movement of the catch piston from the first position to the second position, and operation of both the first valve and the second valve is used to provide pressurized fluid in the pressure chamber and release the catch to drive the stunning rod forward along the longitudinal axis to stun an animal. Still further, the second valve may be operable to control flow of a pressurized fluid from the pressure chamber to the catch piston, and wherein pressurized fluid in the pressure chamber is used to permit the second valve to control movement of the catch piston from the first position to the second position and release the catch to drive the stunning rod forward along the longitudinal axis to stun an animal. A pressure relief valve may be further included, the pressure relief valve being in communication with the pressure chamber to prevent excess pressure of fluid therein.

In yet another aspect, the present invention is directed to a method of stunning an animal. The method provides a pneumatic animal stunner for stunning an animal comprising a housing having a front end, a stunning rod having a rear end portion, a catch, a catch piston, a pressure chamber for supplying a pressurized fluid to drive the stunning rod forward, a passageway between a source of pressurized fluid and the pressure chamber, and a first valve. The stunning rod is within the housing and is capable of being driven forward along a longitudinal axis towards the front end of the housing. The catch is mounted within the housing for alternately holding and releasing the stunning rod. The catch piston is disposed adjacent the catch and in sliding contact therewith. The catch piston is adapted to move between a first position urging the catch to hold and prevent the stunning rod from being driven forward, and a second position releasing the catch to permit the stunning rod to be driven forward. The passageway is open to permit the pressurized fluid to flow into the pressure chamber when the catch piston is in the first position and closed to prevent the pressurized fluid from flowing into the pressure chamber when the catch piston is in the second position. The first valve in the passageway is operable to control the flow of pressurized fluid from the source. When the catch piston is in the first position urging the catch to hold and prevent the stunning rod from being driven forward, the operation of the first valve permits pressurized fluid to flow from the source into the pressure chamber, and when the catch piston is in the second position releasing the catch, operation of the first valve does not permit pressurized fluid to flow from the source into the pressure chamber. The method includes the steps of moving the catch piston into the first position urging the catch to hold and prevent the stunning rod from being driven forward, wherein the operation of the first valve permits pressurized fluid to flow from the source into the pressure chamber, and moving the catch piston into the second position releasing the catch, wherein the operation of the first valve does not permit pressurized fluid to flow from the source into the pressure chamber.

In another aspect, the present invention is directed to a pneumatic animal stunner for stunning an animal comprising a housing having a front portion and rear portion, a stunning rod within the housing front portion, a catch mounted within the housing, and a catch piston disposed adjacent the catch and in sliding contact therewith. The housing front portion is moveable towards and way from the rear portion, between a retracted position and an extended position. The stunning rod is capable of being driven forward along a longitudinal axis to stun an animal, and has a rear end portion. The catch alternately holds and releases the rear end portion of the stunning rod. The catch piston is adapted to move between a first position urging the catch to hold and prevent the stunning rod from being driven forward, and a second position releasing the catch to permit the stunning rod to be driven forward. The housing front portion may be moved toward the housing rear portion to the retracted position to urge the stunning rod rearward and cause the catch piston to move to the first position urging the catch to hold the rear end portion of the stunning rod and prevent the stunning rod from being driven forward.

In an embodiment, the pneumatic animal stunner further includes a pressure chamber between the housing front and rear portions for supplying a pressurized fluid to drive the stunning rod forward, and wherein upon flow of pressurized fluid into the pressure chamber the housing front portion moves away from the rear portion into the housing extended position to operate the stunner. The housing front portion may have a smaller diameter than the housing rear portion, and the housing front portion retracts to a position within the housing rear portion. The housing front portion may further retract into the housing rear portion.

In still another aspect, the present invention is directed to a method of stunning an animal. The method provides a pneumatic animal stunner for stunning an animal comprising a housing having a front portion and rear portion, a stunning rod within the housing front portion, a catch mounted within the housing, and a catch piston disposed adjacent the catch and in sliding contact therewith. The housing front portion is moveable towards and way from the rear portion, between a retracted position and an extended position. The stunning rod is capable of being driven forward along a longitudinal axis to stun an animal, and has a rear end portion. The catch alternately holds and releases the rear end portion of the stunning rod. The catch piston is adapted to move between a first position urging the catch to hold and prevent the stunning rod from being driven forward, and a second position releasing the catch to permit the stunning rod to be driven forward. The housing front portion may be moved toward the housing rear portion to the retracted position to urge the stunning rod rearward and cause the catch piston to move to the first position urging the catch to hold the rear end portion of the stunning rod and prevent the stunning rod from being driven forward. The method includes the steps of moving the housing front portion toward the housing rear portion to the retracted position to urge the stunning rod rearward and cause the catch piston to move to the first position urging the catch to hold the rear end portion of the stunning rod and prevent the stunning rod from being driven forward, and moving the catch piston to the second position releasing the catch to permit the stunning rod to be driven forward to stun the animal.

In yet another aspect, the present invention is directed to a catch engageable with a catch retainer for capturing and releasing a stunning rod moveable along a longitudinal axis in a pneumatic animal stunner for stunning an animal, comprising a plurality of arcuate sections substantially forming a cylinder. Each arcuate section has a forward end, a rearward end and an inner wall toward the longitudinal axis and an outer wall away from the longitudinal axis, a flange at the rearward end of the arcuate section extending outwardly directly from the outer wall and away from the longitudinal axis, and a flange at the forward end of the arcuate section extending outwardly from the inner wall and toward the longitudinal axis. Each of the arcuate section rearward flanges is engageable with a groove of the catch retainer allowing the arcuate sections to pivot about the catch retainer groove. The arcuate sections are pivotable from a closed position wherein the arcuate section forward flanges extended outwardly from the longitudinal axis to an open position wherein the arcuate section forward flanges are extended toward the longitudinal axis when the arcuate sections pivot about the catch pivot ring inner lip to the closed position.

In an embodiment, the catch is engageable with a catch piston in the pneumatic animal stunner, wherein the each arcuate section forward end is moveable by the catch piston to a hold position away from the longitudinal axis where the arcuate section forward flange engages the stunning rod, preventing the stunning rod from being driven in a forward direction. The outer wall of each of the arcuate sections may have a substantially straight portion between the outwardly extending forward and rearward flanges, and the inner wall of each of the arcuate sections has a substantially straight portion between the forward and rearward ends. Each of the arcuate sections may further have an arc of between about 90° and 120°.

In another aspect, the present invention is directed to a stunning rod moveable along a longitudinal axis in a pneumatic animal stunner for stunning an animal, comprising an elongated cylindrical body, a forward end of the body for receiving a nose piece to contact the animal during stunning, and a rearward end of the body having an outwardly extending piston for sliding in the stunner. An opening within the rearward end has an inwardly extending peripheral lip for contacting a catch to hold the stunning rod, the opening having a wall at a forward end thereof for contacting a catch piston to move the catch into position to contact the stunning rod peripheral lip and hold the stunning rod.

In a further aspect, the present invention is directed to a fluid pressure regulator for regulating the pressure of fluid received in a pneumatic animal stunner for stunning an animal, comprising a tank mount for receiving a pressurized fluid container, a regulator disposed on the tank mount, a rotatable regulator adjustment knob, and a projection extending from one or the other or both of the regulator and/or regulator knob. The regulator adjustment knob extends from the regulator for regulating pressure of the fluid from the fluid container. The projection limits the rotational range of travel of the regulator adjustment knob. Rotation of the regulator knob may adjust the pressure levels of a fluid released from the fluid container within a desired range established by the rotation travel of the knob as limited by the projection.

In an embodiment, the regulator includes an adjusting cap received in an end of the regulator, and a regulator collar encasing the regulator, and wherein the regulator knob has a post for reception by the adjusting cap, the adjusting cap securing the regulator knob within the regulator. The regulator collar may further comprise a tab for limiting the rotational range of the regulator knob. The regulator knob may include at least one bore about its periphery for receiving a screw projection for limiting the rotational range of the regulator knob.

In still another aspect, the present invention is directed to a method of regulating the pressure of a fluid received in a pneumatic animal stunner for stunning an animal. The method provides a stunner having a tank mount, the tank mount receiving a fluid container, a regulator disposed on the tank mount, a regulator adjustment knob, and a projection extending from one or the other or both of the regulator and/or regulator knob. The adjustment knob extends from the regulator for regulating pressure of the fluid from the container. The projection limits rotational range of travel of the regulator adjustment knob. The method includes the step of rotating the regulator knob to adjust the pressure levels of a fluid released from the fluid container within a desired range established by the rotation travel of the knob as limited by the projection.

In an embodiment, the method further provides a tab disposed on the regulator collar for limiting the rotational range of the regulator knob. At least one bore about the periphery of the regulator knob is provided. At least one screw is inserted into the at least one bore in the regulator knob, and wherein upon rotation of the regulator knob, the inserted screw makes contact with the regulator collar tab, preventing the regulator knob from further rotation in the direction it is rotated. A plurality of screws may be inserted into a plurality of bores in the regulator knob, decreasing the rotational range of the knob, and wherein the adjustable range of pressure of fluid released from the fluid container is decreased.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 9 is a perspective view of an embodiment of the stunner of the present invention.

FIG. 10 is a side elevational view of the stunner of FIG. 9.

FIG. 11 is a rear perspective view of the stunner of FIG. 9.

FIG. 12 is a bottom perspective view of the stunner of FIG. 9.

FIG. 13 is another rear perspective view of the stunner of FIG. 9.

FIG. 14 is a perspective view of an embodiment of a single catch used in the stunner of the present invention.

FIG. 15 is a rear perspective view of the single catch of FIG. 14.

FIG. 16 is a front elevational view of the single catch of FIG. 14.

FIG. 17 is a side elevational view of the single catch of FIG. 14.

FIG. 18 is a rear elevational view of the single catch of FIG. 14.

FIG. 19 is a bottom perspective view of the single catch of FIG. 14.

FIG. 20 is a bottom rear perspective view of the single catch of FIG. 14.

FIG. 21 is a side elevational view of an embodiment of relative orientation of the three segment catch used in the stunner of the present invention.

FIG. 22 is a perspective view of relative orientation of the three segment catch of FIG. 21.

FIG. 23 is a front perspective view of relative orientation of the three segment catch of FIG. 21.

FIG. 24 is a front elevational view of relative orientation of the three segment catch of FIG. 21.

FIG. 25 is a side elevational view of relative orientation of the three segment catch of FIG. 21.

FIG. 26 is a rear elevational view of relative orientation of the three segment catch of FIG. 21.

FIG. 27 is another side elevational view of relative orientation of the three segment catch of FIG. 21.

FIG. 28 is a bottom perspective view of relative orientation of the three segment catch of FIG. 21.

FIG. 29 is still another side elevational view of relative orientation of the three segment catch of FIG. 21.

FIG. 30 is a top perspective view of relative orientation of the three segment catch of FIG. 21.

FIG. 36 is a perspective view of an embodiment of the three segment catch positioned around the catch release piston and within the catch retainer in the stunner of the present invention.

FIG. 37 is a side elevational view of the three segment catch, catch release piston, and catch retainer of FIG. 36.

FIG. 38 is a rear perspective view of the three segment catch, catch release piston, and catch retainer of FIG. 36.

FIG. 39 is a bottom perspective view of the three segment catch, catch release piston, and catch retainer of FIG. 36.

FIG. 40 is a top perspective view of the three segment catch, catch release piston, and catch retainer of FIG. 36.

DESCRIPTION OF THE EMBODIMENT(S)

In describing the embodiment(s) of the present invention, reference will be made herein to the drawings below and FIGS. 1-48 attached hereto in which like numerals refer to like features of the invention.

Figure 4:
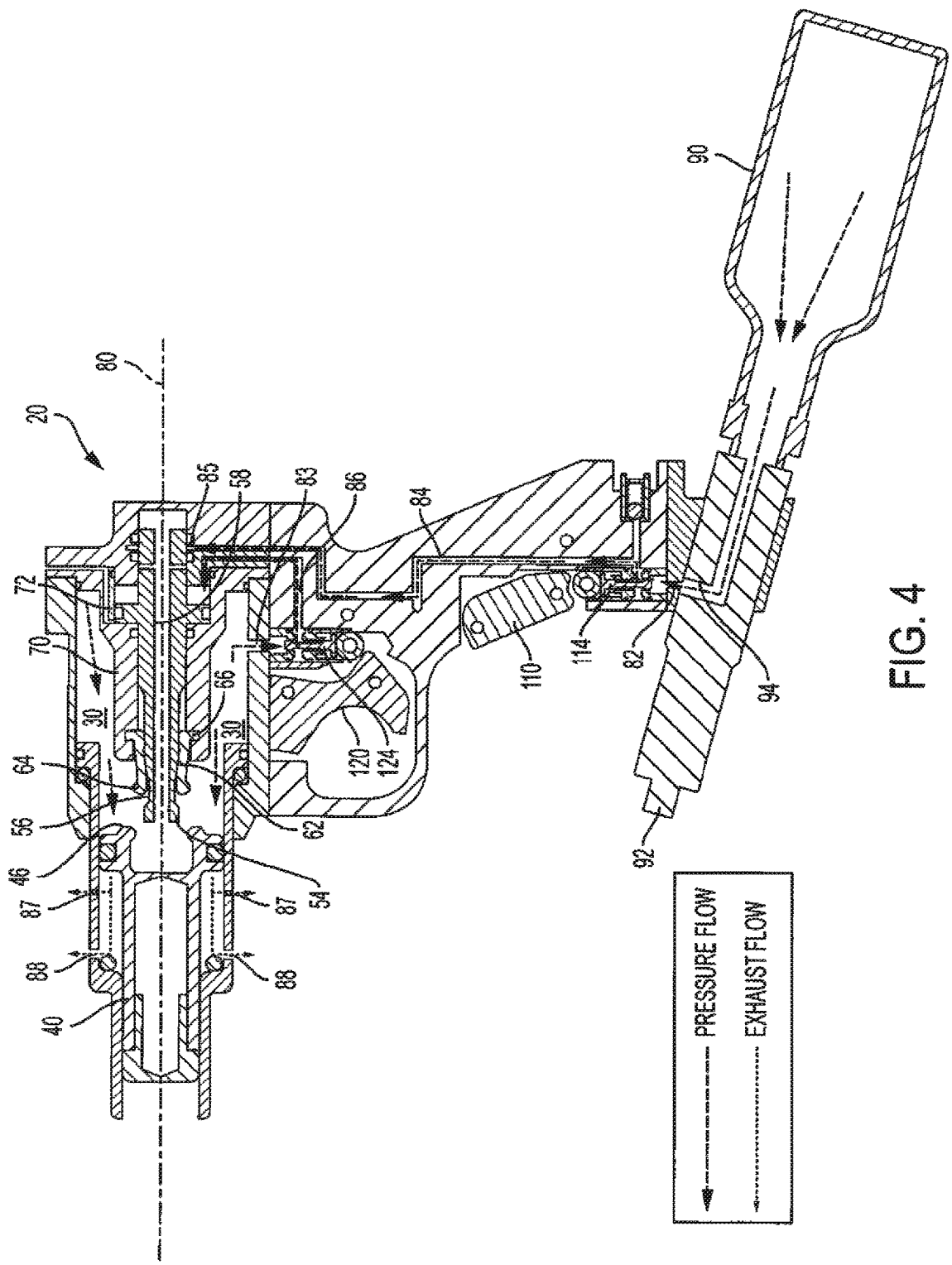
FIG. 4 is a cross-sectional view of the stunner of FIG. 1 showing path of fluid flow with a source of pressurized fluid attached, both the lower supply trigger and the upper fire trigger depressed, and the catch, catch piston and stunning rod in the release position.
Figure 5:
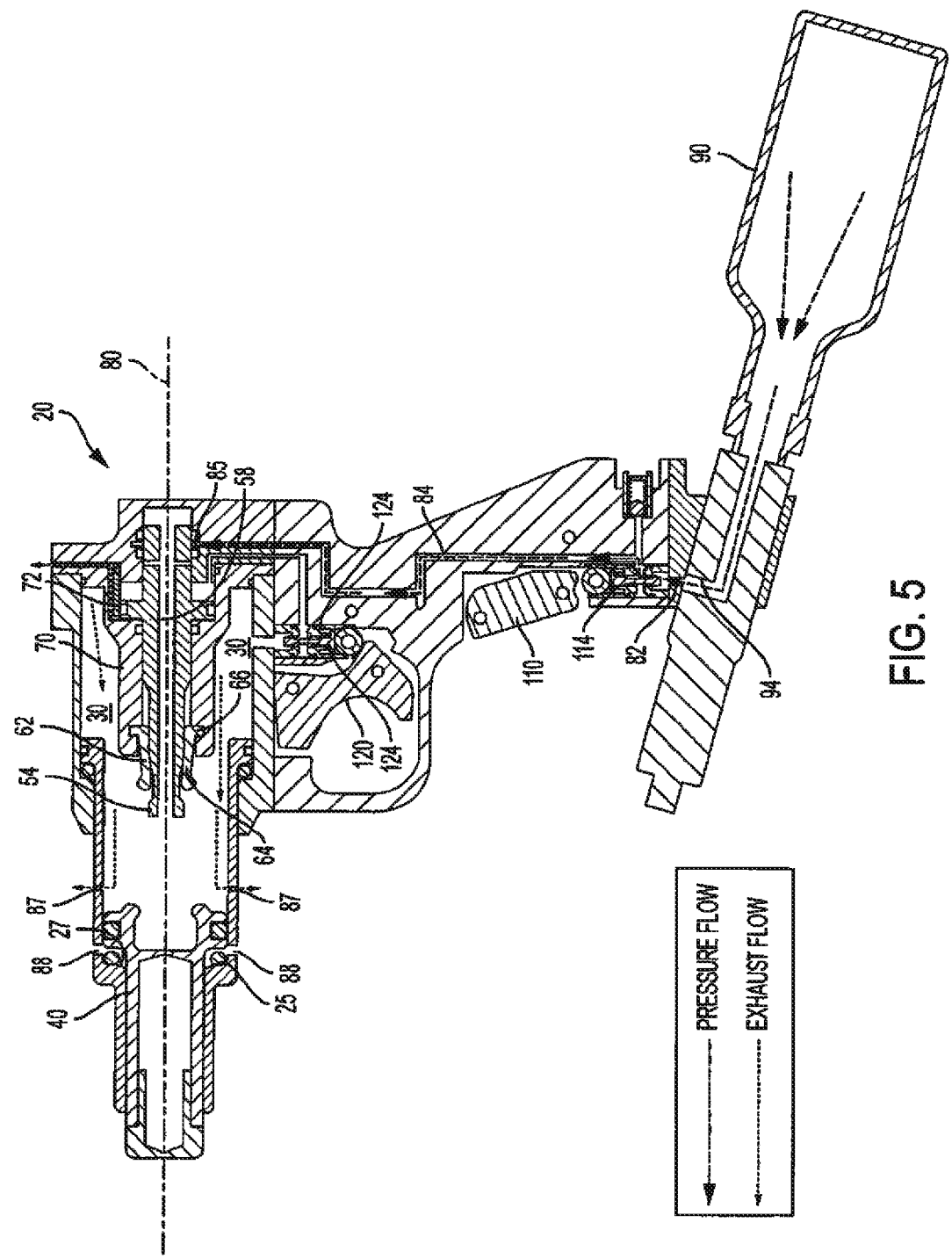
FIG. 5 is a cross-sectional view of the stunner of FIG. 4 showing path of fluid flow with the stunning rod in the fully forward position.
Figure 6:
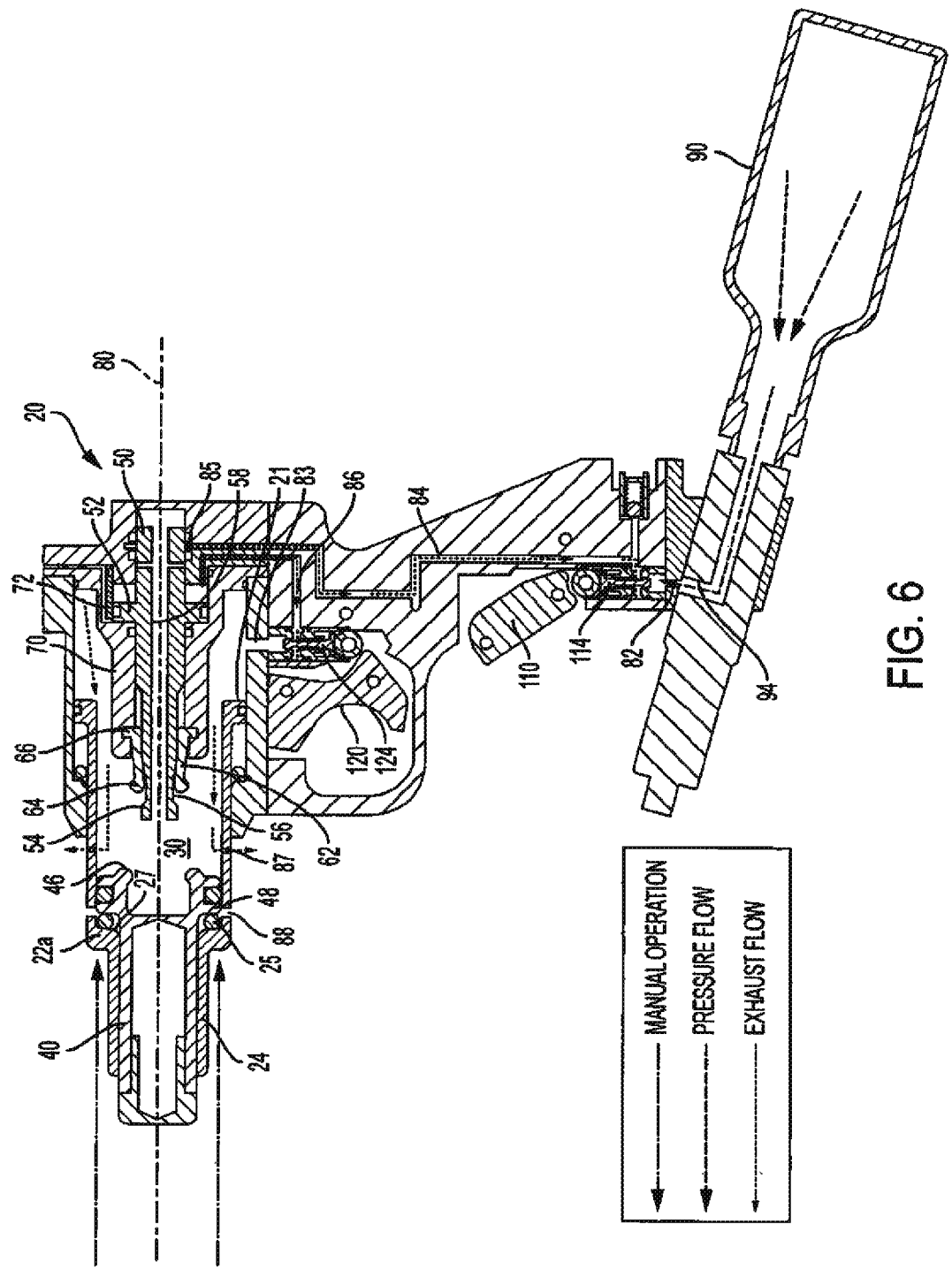
FIG. 6 is a cross-sectional view of the stunner of FIG. 5 showing path of fluid flow with the stunning rod in the fully forward position, and both the lower supply trigger and the upper fire trigger undepressed.
Figure 7:
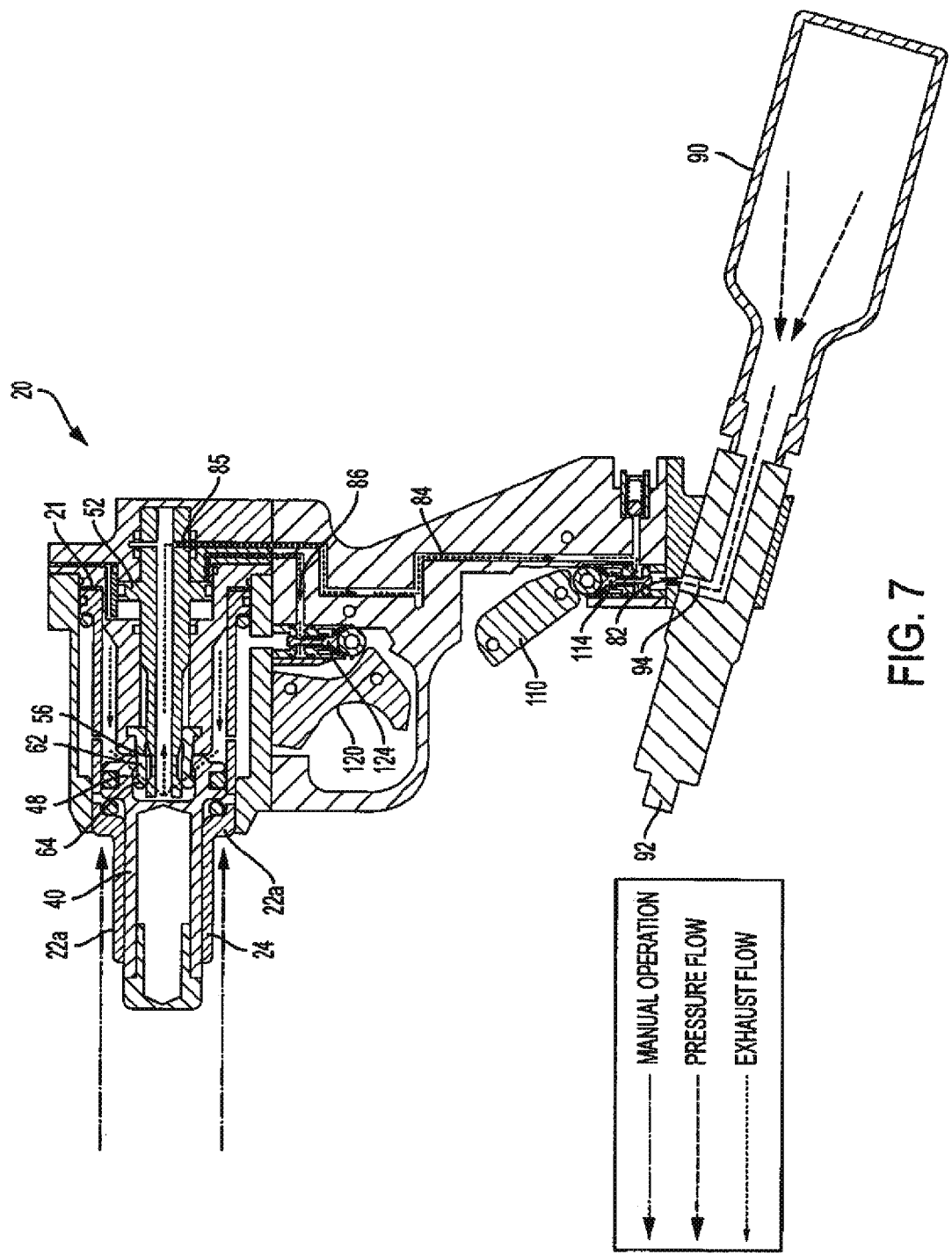
FIG. 7 is a cross-sectional view of the stunner of FIG. 6 showing path of fluid flow with the forward housing portion and stunning rod manually retracted back to the catch and catch piston hold position, and both the lower supply trigger and the upper fire trigger undepressed.

Structure and operation of the exemplary animal stunner 20 is shown in general in the cross-sections of FIGS. 1-8, an exemplary stunner is shown in external views in FIGS. 9-13 and structure of an exemplary catch used in the stunner is shown in FIGS. 14-40. The stunner 20 includes an outer elongated hollow housing 22, an outer housing nose or front end 24, a tail end 26, a stunning rod 40 moveable forward and rearward about longitudinal axis 80 and catches 60 arrayed about longitudinal axis 80 for holding and releasing the stunning rod 40. The forward and rearward directions described herein are with respect to the stunner front end 24, and inward and outward directions described herein are with respect to axis 80. Housing 22 has a front portion 22a and a rear portion 22b, each being generally cylindrical in configuration. Front portion 22a is moveable along longitudinal axis 80 toward and away from rear portion 22b, between retracted and extended positions, respectively. Front peripheral wall 29 of rear housing portion 22b limits forward motion of front portion 22a, and carries O-ring cushion 23. Housing portions 22a and 22b form an inner pressure or fire chamber 30, and an O-ring 32 in an outwardly facing groove at the rear end flange 21 of front housing 22a slidingly contacts and seals against the inner surface of rear housing 22b to permit the fire chamber to receive and hold a pressurized fluid. The housing retracted position is shown in FIGS. 6 and 7 and the housing extended position is shown in the remaining Figs.

A piston 48 surrounded by an O-ring seal 49 slides along the inner cylindrical surface of the portion of chamber 30 within front housing portion 22a. Piston 48 moves forward and rearward along axis 80, and carries stunning rod 40. Front peripheral wall 27 of front housing portion 22a limits forward motion of piston 48 and stunning rod 40, and carries O-ring cushion 25. The rearward end of stunning rod 40 has an opening with an inward lip 46 extending about its periphery, which lip is alternately held and released by an outwardly extending flange 64 at the forward end of catch 60. Forward of lip 46 within the rear opening is stunning rod rear wall 42. The body or shaft of stunning rod 40 may be circular or non-circular in shape as viewed in cross-section normal to the longitudinal axis. The forward end or nose 44 of the stunning rod extends in a sliding fit through a correspondingly configured opening in nose 24 of housing front portion 22a to be driven toward the animal's head when the catch releases the stunning rod lip 46. The stunning rod forward end 44 may be sized with a diameter and configuration either to penetrate, or prevent penetration of (i.e. concuss), the animal's head.

The catch system for holding and releasing the stunning rod as shown in the embodiment is disposed primarily within the portion of fire chamber 30 in rear housing portion 22b. Catches 60 are further shown in FIGS. 14-40 and are arcuate catches that may be arrayed around axis 80 (see also FIGS. 21-30). Each catch may have a body 62 curved in an arc segment about the longitudinal axis, with outwardly extending flanges 64 and 66 at the front and rear ends, respectively. Each catch 60 in the embodiment shown has an arc of more than 90° and less than 120° so that three catches may be arranged cylindrically about the longitudinal axis 80 with sufficient space between adjacent catches to pivot inwardly without interfering with one another. Fewer or more than three catches may be employed. A generally hollow cylindrical catch retainer 70 (see also FIGS. 36-40) extends forward from the rear end of housing portion 22b, and has an outer diameter smaller than the inner diameter of front housing portion 22a, to permit front housing portion 22a to slide and retract within rear housing portion 22b. The retraction of front housing portion 22a within rear housing portion 22b may be without relative rotation between the two portions. The front portion of catch retainer 70 extends over and around, and secures the rearward end portions of catches 60. The catch retainer 70 has at its forward end an inwardly facing groove, which receives the catch rear end flanges 66 on a side away from axis 80. Catch release piston 50 is slidingly received within the central opening of retainer 70 and moves forward and rearward along axis 80, as shown in cross-section in FIGS. 1-8 and in side and perspective views in FIGS. 31-40. Catch piston 50 has release piston portion 52 sliding within a larger diameter catch piston chamber 72 in the rear portion of catch retainer 70. Catch release piston 50 has a central opening 58 extending along axis 80, and forward of release piston portion 52 catch release piston 50 has a generally cylindrical body portion sliding within and contacting the rearward ends of catches 60. The support provided to the catch rear end portions by the inner catch piston body and the outer catch ring permits the catches 60 to rotate and their forward end flanges 64 to pivot inwardly and outwardly around rearward end flanges 66 in the retainer 70 groove.

The catch forward ends may be moved outwardly to a hold position, away from axis 80, so that forward end flanges 64 contact the rod 40 rear end portion and prevent the stunning rod from being driven forward. To accomplish such movement, catch piston 50 has a forward end portion 54 within the catches which has a diameter sufficient to contact and urge catch forward end portion flanges 64 outward into engagement with the stunning rod opening lip 46. When catch piston 50 is moved rearward into the hold position, the catch forward end portion is aligned with and in contact with both the stunning rod opening lip 46 and the catch piston forward end portion 54.

Rearward of the forward end portion 54 the catch piston has a relief portion 56 with a diameter smaller than the forward end portion diameter. This relief portion diameter is sufficiently small to permit catch forward end portion 64 to move freely inward to the release position, with flanges 64 out of engagement with the stunning rod opening lip 46. The rearward sides of front flanges 64 are beveled 65 at an angle greater than 90° with the catch body 62 (FIGS. 14-20), so that when catch piston 50 is moved forward from the hold position to the release position, with relief portion 56 below the catch forward ends, pressure urging piston 48 and stunning rod 40 forward will cause flanges 64 and catch front ends to spring inward into relief portion 56 as stunning rod lip 46 moves along the beveled flange surfaces 65. When the catch forward end flanges 64 are disengaged from rod lip 46, the stunning rod 40 may be driven forward.

Stunner 20 may be operated by pressurized fluid, such as compressed air or compressed $CO_2$, or any other suitable fluid. For the example shown, compressed CO2 is supplied from a portable tank or container 90 shown secured to the lower end of handle 28 by tank mount 96. Any other source of gas may be employed, such as from a hose or line. $CO_2$ flow is controlled by regulator 92 and flows through outlet 94 into inlet 82 in handle 28. FIGS. 1-13 show stunner 20 employing one embodiment of regulator 92, which comprises a rotatable screw inserted into the front end of regulator 92. The fluid pressure from tank 90 may be adjusted by a simple turn of the screw in regulator 92 using a screwdriver, wrench, or the like wherein turning the screw in one direction increases PSI (Pounds per Square Inch) levels, and turning the screw in the other direction decreases PSI levels.

Another embodiment of the regulator 92 for stunner 20 is exemplified in FIGS. 41-48. The regulator 92 includes a rotatable regulator control or adjustment knob 93 disposed on and threaded into the end 92a of regulator 92, which is located on the front end of tank mount 96 opposite $CO_2$ container 90. A regulator clamp/collar 91 (FIG. 48) may be provided to fit over the regulator end 92a prior to installation of the regulator knob 93. The regulator end 92a may receive therein a regulator adjusting cap 95 in either a tight sliding fit or by threaded connection. Adjusting cap 95 may have a central threaded bore for receiving the threaded post of knob 93. A projection may extend from one or the other or both of the regulator and/or regulator knob for limiting rotational range of travel of the regulator adjustment knob, to adjust the pressure levels of the fluid released from the fluid container within a desired range established by the rotation travel of the knob as limited by the projection. In the embodiment depicted, regulator knob 93 includes one or more threaded bores or holes 97 spaced about the periphery of its head for receiving screws 98 or other projections to serve as one or more blocking structures to halt rotation of the knob beyond a certain desired point (FIGS. 42-47). Regulator collar 91 comprises a projection or tab 91a protruding from its top edge toward the bottom edge of knob 93, the edge of which contacts the edge of projection or screw 98 (if used) during rotation of the knob 93 to stop the knob rotation beyond a certain desired point selected by the screw hole 97 used. Proper installation of the regulator collar 91, adjusting cap 95, and knob 93 will permit an operator to limit and adjust PSI levels within a desired range, e.g., of about 75 PSI, when using only one screw. This PSI range may be larger or smaller depending on operator preference. Multiple screws 98 (FIG. 46) may be employed to narrow the adjustable PSI range to smaller values, e.g., between about 15 PSI, 30 PSI, 45 PSI, 60 PSI, and 75 PSI, determined by the allowed range of rotation between two screws disposed in the knob 93 before either screw contacts collar tab 91a. Preferable allowed PSI ranges for operation of the stunner 20 may be between about 200 PSI-125 PSI, though this PSI range can be increased or decreased based upon operator preference.

Flow of the pressurized fluid is then controlled by supply valve 114 into passageway 84 through handle 28, which permits the compressed fluid to move freely and quickly between container 90 and fire chamber 30 (FIGS. 1-8). In the embodiment shown, the passage of pressurized fluid may be contingent on certain components of the stunner being in their desired positions. A first, supply trigger 110 in the lower end of handle 28 operates first supply valve 114 to control flow of fluid from the pressurized fluid source to charge or fill fire chamber 30. When the supply trigger 110 is in the undepressed position, an opening in the upper portion of supply valve 114 vents any fluid in fire chamber 30 through passageway 84 to atmosphere. When operated by depressing and holding supply trigger 110, the upper portion is closed and the lower portion of supply valve 114 is opened and pressurized fluid flows from container 90 up through passageway 84 to a point adjacent a rear portion of catch piston 50. The upper end of passageway 84 may encircle the rear portion of catch release piston 50. One or more radial passageways 85 extend through catch piston 50 to central opening 58, and passageways 84 and 85 are aligned when catch piston 50 is moved rearward into the hold position. Because there is a space between catches 60, fluid may flow freely between catch piston central opening 58 and fire chamber 30. In this position the passageways are fully open to permit the pressurized fluid to flow from container 90 into fire chamber 30, only when the catch piston is in the hold position. Passageway 85 is out of alignment and blocked from passageway 84 and passageway 84 is consequently closed to prevent the pressurized fluid from flowing from container 90 into the fire chamber when the catch piston is moved from the hold position forward to the release position. Accordingly, when the catch piston is in the hold position, the operation of the supply valve 114 by depressing and holding down the supply trigger makes it possible to permit pressurized fluid to flow from the source into the fire chamber. However, when the catch piston is in the release position, operation of valve 114 by depressing the supply trigger does not permit pressurized fluid to flow from the source into the fire chamber.

In the embodiment shown, when the catch piston is in the hold position and the supply trigger 110 is depressed and supply valve 114 opened, a pressurized fluid is injected into the fire chamber. A second condition is used to fire the stunner. This condition is provided by a second fire trigger 120 disposed in the upper portion of handle 28 above supply trigger 110, which operates second fire valve 124. When fire trigger 120 is undepressed the lower portion of fire valve 124 is open to permit pressurized fluid to exhaust from the rear portion of catch piston chamber 72, behind catch release piston portion 52, through passageway 86. Fire trigger 120 when depressed closes the lower portion and opens the upper portion of valve 124 between fire chamber opening 83 and passageway 86 in communication with the portion of catch piston chamber 72 behind piston portion 52 of catch piston 50. If the fire chamber 30 is pressurized, when fire valve 124 is opened, pressurized fluid from fire chamber 30 travels through opening 83 and passageway 86 to urge piston portion 52 forward and move catch release piston 50 forward into the position. This forward movement of end 54 releases catches 60 and permits inward retraction of forward catch latches 64 to relief portion 56 to release stunning rod 40. Thus, an additional measure of safety is provided by requiring the pulling and holding of both supply trigger 110 and fire trigger 120, and operation of both supply valve 114 and fire valve 124, to fully open passageways 82, 83, 84, 85 and 86 to provide pressurized fluid to both the fire chamber 30 and catch piston chamber 72 so as to release the catch piston and catch to drive the stunning rod forward to stun the animal.

A pressure relief valve 130 is disposed in center handle 28 and is in communication with passageway 84 between supply valve 114 and fire chamber 30. The relief valve is selected and set to vent fluid when the pressure exceeds a predetermined safe level, to prevent excess pressure of fluid therein, in the event that tank regulator 92 is inoperative or insufficient to do so.

Figure 1:
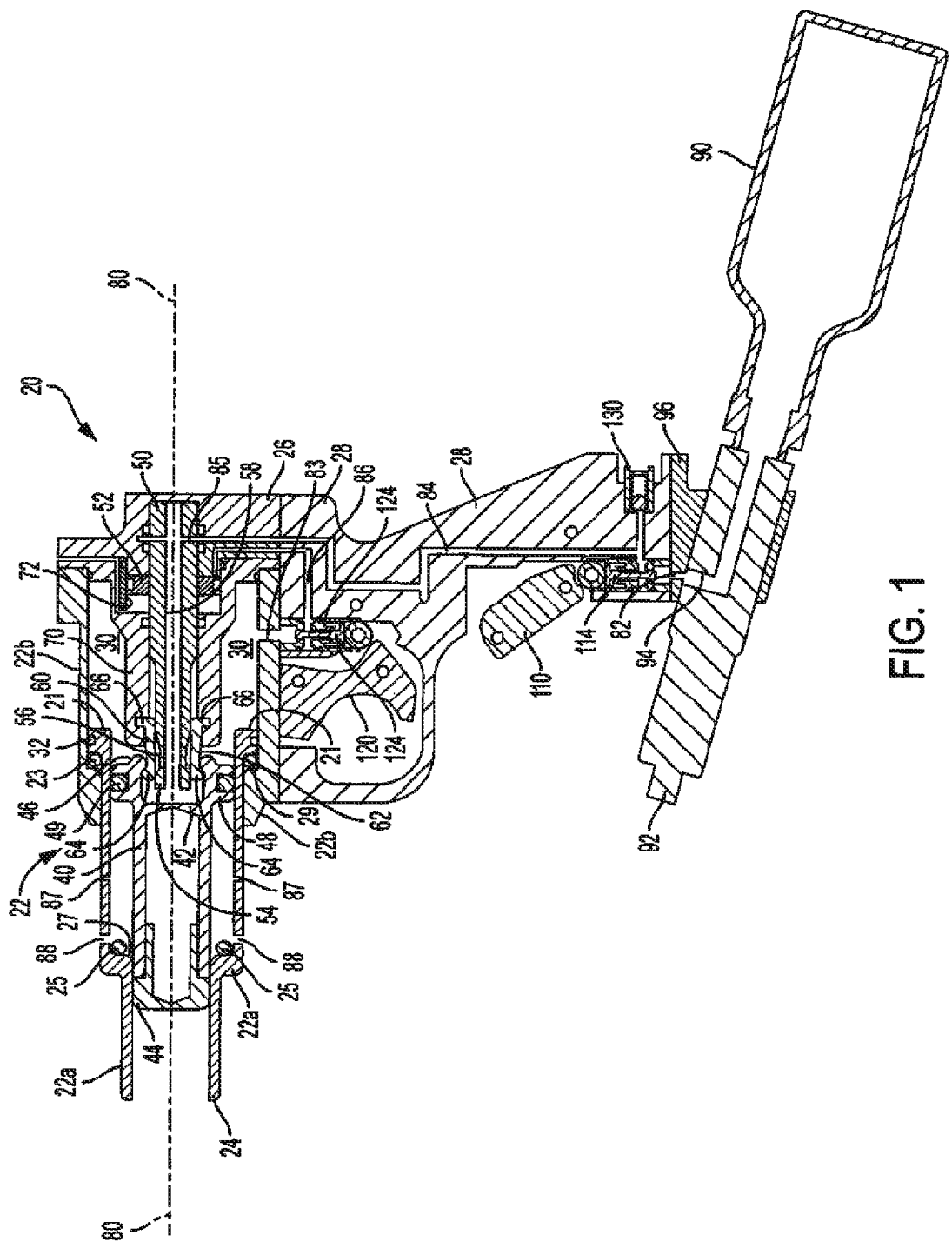
FIG. 1 is a cross-sectional view of an embodiment of the stunner of the present invention.
Figure 2:
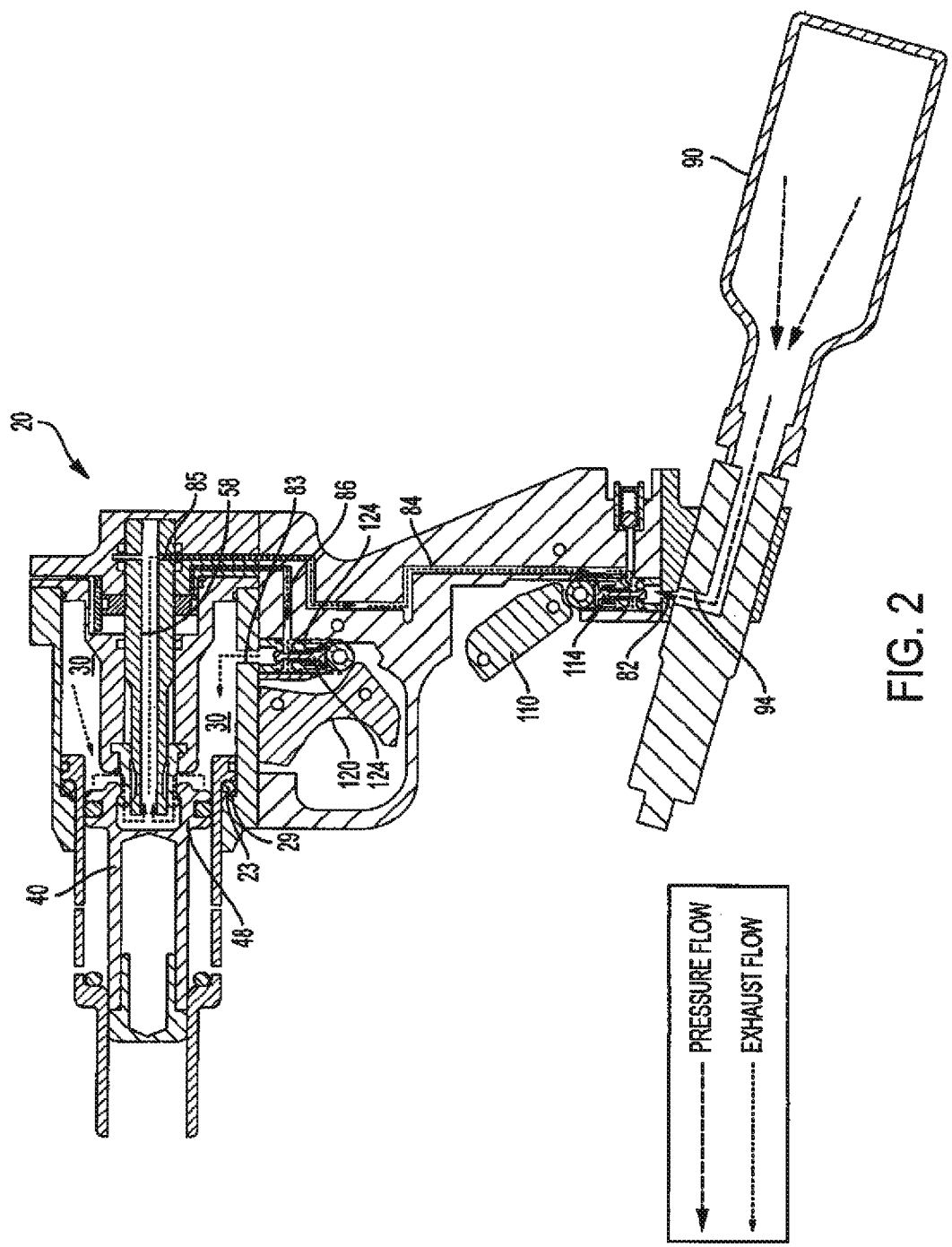
FIG. 2 is a cross-sectional view of the stunner of FIG. 1 showing path of fluid flow with a source of pressurized fluid attached, both triggers undepressed, and the catch, catch piston and stunning rod in the hold position.

When the pressurized fluid source 90 is connected, catch release piston 50 is locked in the rearward hold position, and supply trigger 110 and fire trigger 120 are undepressed, stunner 20 is in a neutral state, as shown in FIG. 2. The lower portion of supply valve 114 is closed, thereby venting fluid in fire chamber 30 to atmosphere through the gaps between catches 60, piston central opening 58, passageways 85 and 84, and then out through the upper open portion of valve 114. The upper portion of fire valve 124 is closed, and fluid in the portion of catch piston chamber 72 is vented into the atmosphere through passageway 86 and then out through the lower open portion of valve 124.

Figure 3:
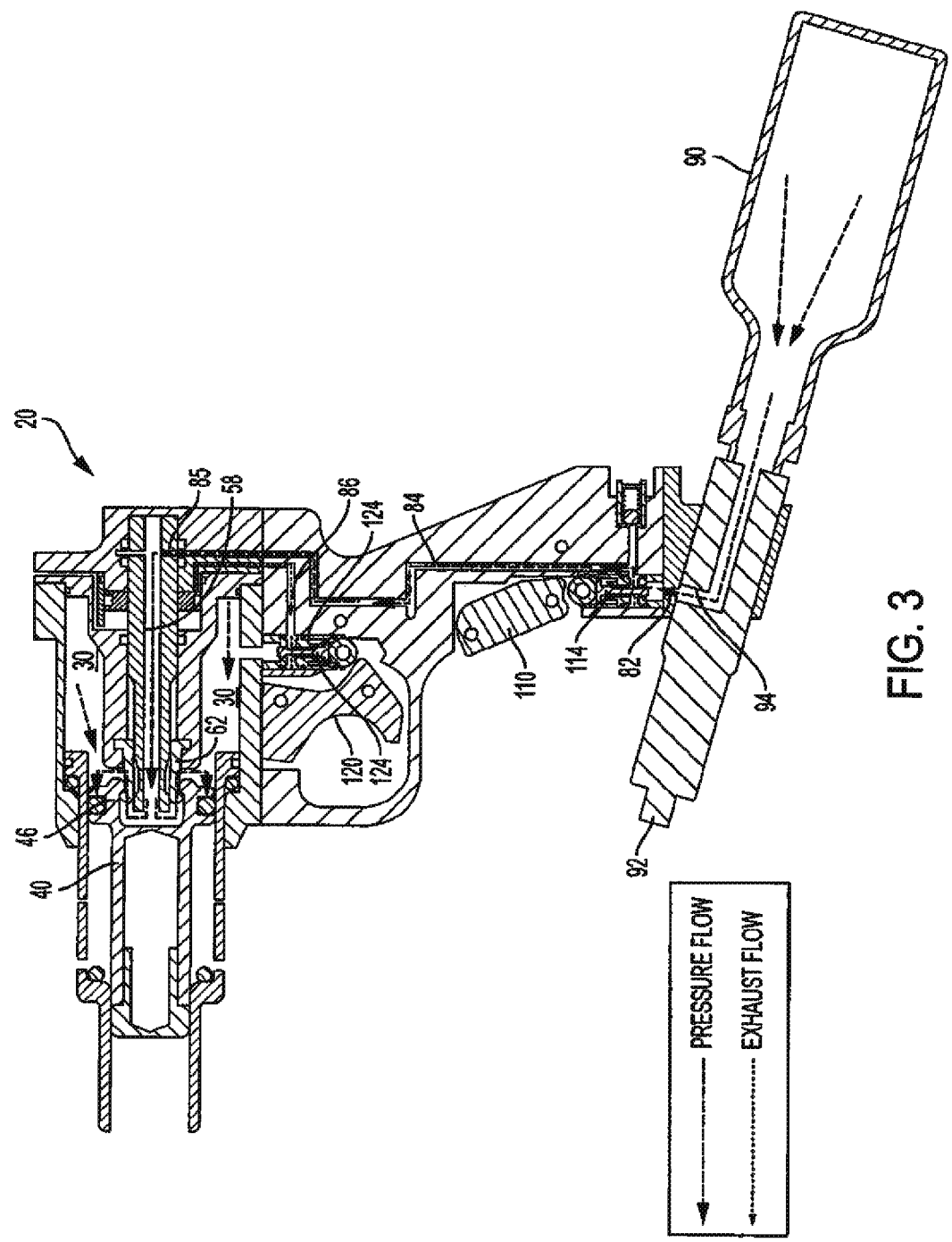
FIG. 3 is a cross-sectional view of the stunner of FIG. 1 showing path of fluid flow with a source of pressurized fluid attached, the lower supply trigger depressed and the upper fire trigger undepressed, and the catch, catch piston and stunning rod in the hold position.

Operation of the stunner is as follows: The operator grasps the stunner handle 28 between the thumb and index finger, and with the remaining fingers depresses lower supply trigger 110 as shown in FIG. 3 to pressurize fire chamber 30 by flow of fluid through valve 114 and passageway 84. The fire chamber will only fill if catch release piston 50 is in the catch hold position because the fire chamber fill fluid flows through passageway 85 in the catch piston, so the catch piston has to be in the hold position for the passageway porting 85 to line up with passageway 84. Pressurized fluid in fire chamber 30 exerts a force against stunning rod piston 48, which is held from forward movement only by the position of catch flanges 64 retaining stunning rod rear lip 46.

The operator positions the stunner to the animal and then fires the stunner by depressing fire trigger 120 with the index finger, while continuing to depress supply trigger 110, as shown in FIG. 4. This trigger upon being depressed sends pressurized fluid from fire chamber 30 through opening 83 and valve 124 through passageway 86 to the top of the catch piston, catch piston chamber 72 behind piston portion 52, and moves catch piston 50 forward, so that the catch piston forward end 54 no longer holds the forward ends of the catches in the outward position. In this catch release position the forward force on stunning rod 40 by the pressurized fluid causes stunning rod lip 46 acting on catch beveled flange surfaces 65 to urge front catch flanges 64 inward into catch relief portion 56. Because the stunner receives pressurized fluid to move catch release piston 50 into the release position from fire chamber 30, this provides a safety feature since the catch release piston cannot move into the release position unless the fire chamber is charged.

Once the operator presses the fire trigger the stunning rod 40 is released and travels to the end of the forward stroke where piston 48 contacts O-ring cushion 25 seated against front housing peripheral wall 27, as shown in FIG. 5. Front housing openings 88 permit fluid in front of the stunning rod piston to be vented into the atmosphere. In the forward position fire chamber vents 87 are exposed, and remaining fluid in fire chamber 30 is vented into the atmosphere.

Additionally, once catch release piston 50 has moved to the forward release position, the fill pressurized fluid passageway 84 is cut off, which helps to conserve pressurized fluid by not allowing any more to enter the fire chamber even if the supply trigger remains pressed or is pressed again. This is especially useful when fluids such as $CO_2$, nitrogen, compressed air, and more from portable containers are used as the pressurized fluid.

After firing, fire trigger 120 and supply trigger 110 are released. Stunning rod 40 does not automatically return so the operator then has to reset the stunning rod into the fire position manually. To reset the stunner, as shown in FIG. 6 the operator with their free hand pushes the front part 22a of the housing into the rear part 22b of the housing, which causes it to collapse into itself without relative rotation of the housing portions. As front housing portion 22a is moved rearward by hand to the retracted position, front peripheral wall 27 and O-ring cushion 25 urge piston 48 and stunning rod 40 rearward as front housing portion 22a slides within rear housing portion 22b. Openings 87 assist in venting fluid between the housing portions. When lip 46 of stunning rod 40 passes behind the front flanges 64 of catches 60, as shown in FIG. 7, stunning rod rear wall 42 contacts catch release piston forward end 54 and slides the catch release piston to the rearward position. This rearward movement slides the catch piston forward end 54 to a position within the catch forward end portions and urges the catch forward end portion flanges 64 outward into engagement with the stunning rod opening periphery 46 to hold and prevent the stunning rod from being driven forward. The stunner may be left in this collapsed position for storage or the front end 22a of the housing may be manually pulled forward by hand, making the stunner full length again. By configuring the stunner housing 22 to collapse, a spring or other mechanical device to return the stunning rod to the fire position may be eliminated. Also, by eliminating the spring or return device, the stunner can generate more power at the end of stroke of the stunning rod, since collapsing a mechanical spring return robs power at the end of stroke, where the power is most needed.

Figure 8:
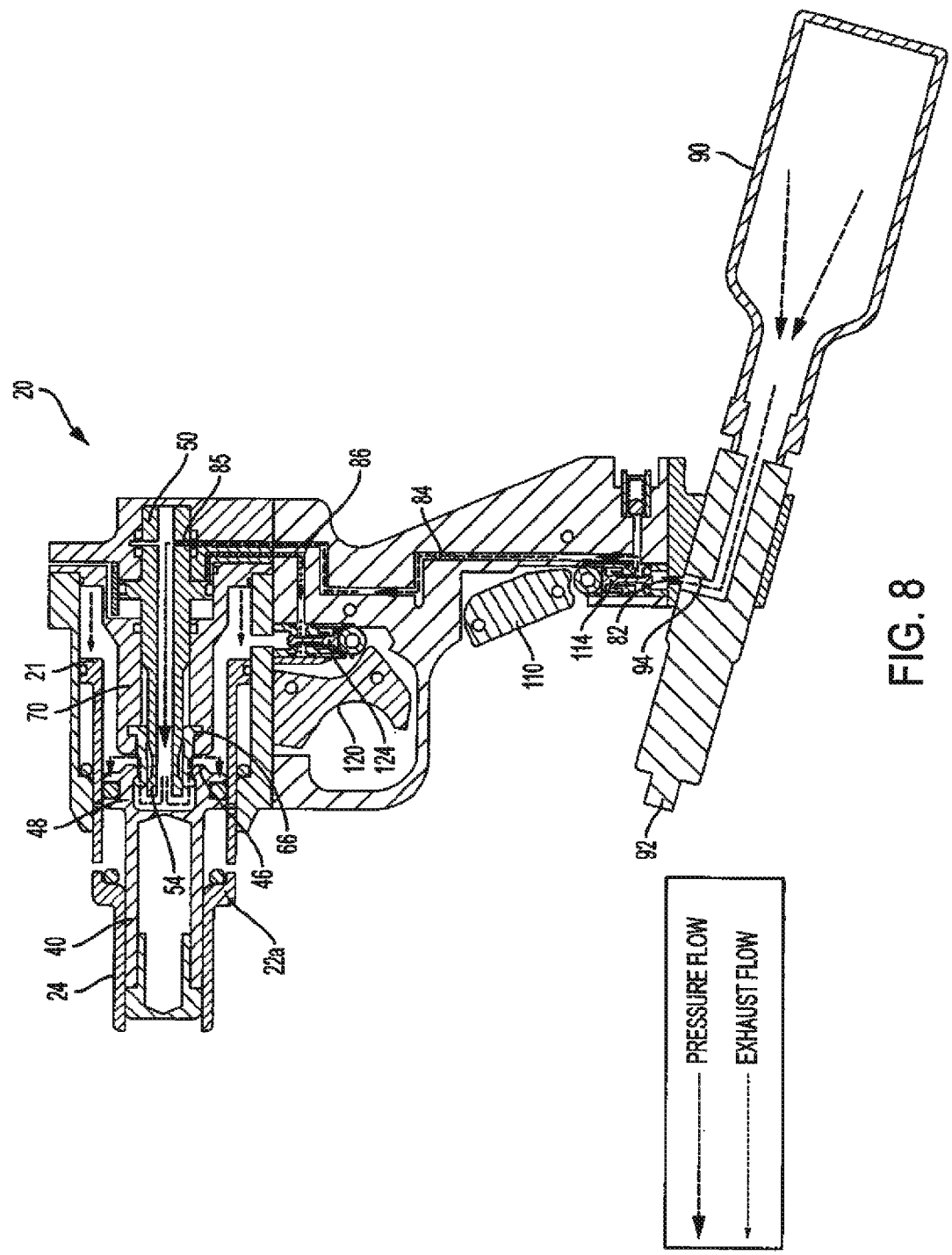
FIG. 8 is a cross-sectional view of the stunner of FIG. 7 showing path of fluid flow, after the lower supply trigger is depressed and the upper fire trigger remains undepressed, with the forward housing portion returned to the fully forward, extended position.
Figure 33:
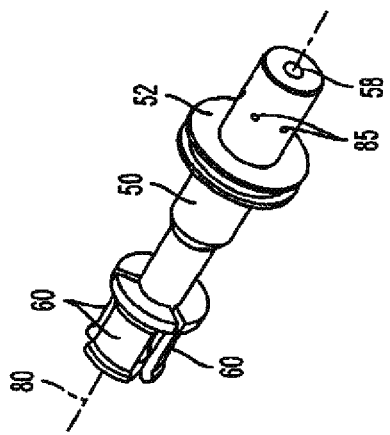
FIG. 33 is another perspective view of the three segment catch and catch release piston of FIG. 31.
Figure 35:
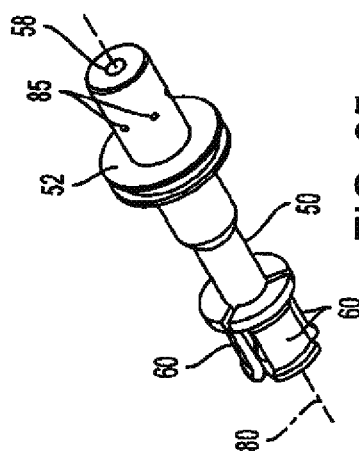
FIG. 35 is another bottom perspective view of the three segment catch and catch release piston of FIG. 31.
Figure 32:
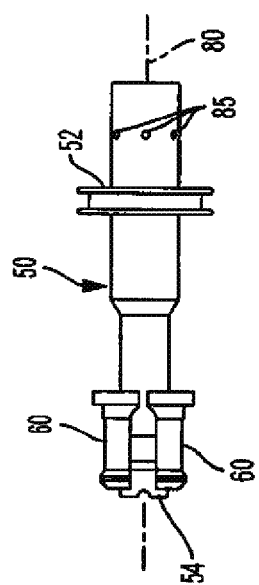
FIG. 32 is a side elevational view of the three segment catch and catch release piston of FIG. 31.
Figure 31:
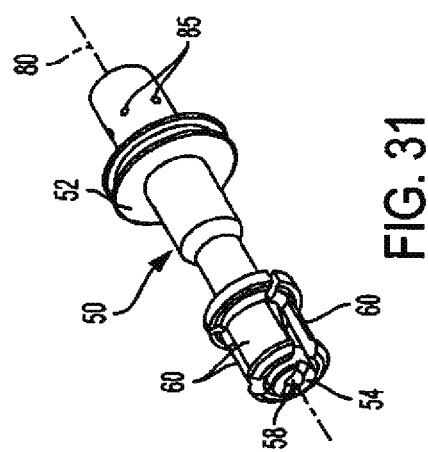
FIG. 31 is a perspective view of an embodiment of the three segment catch positioned around the catch release piston in the stunner of the present invention.
Figure 34:
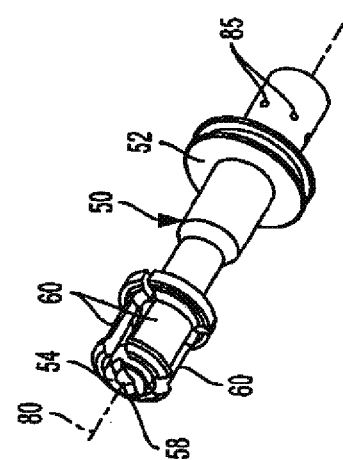
FIG. 34 is a bottom perspective view of the three segment catch and catch release piston of FIG. 31.
Figure 41:
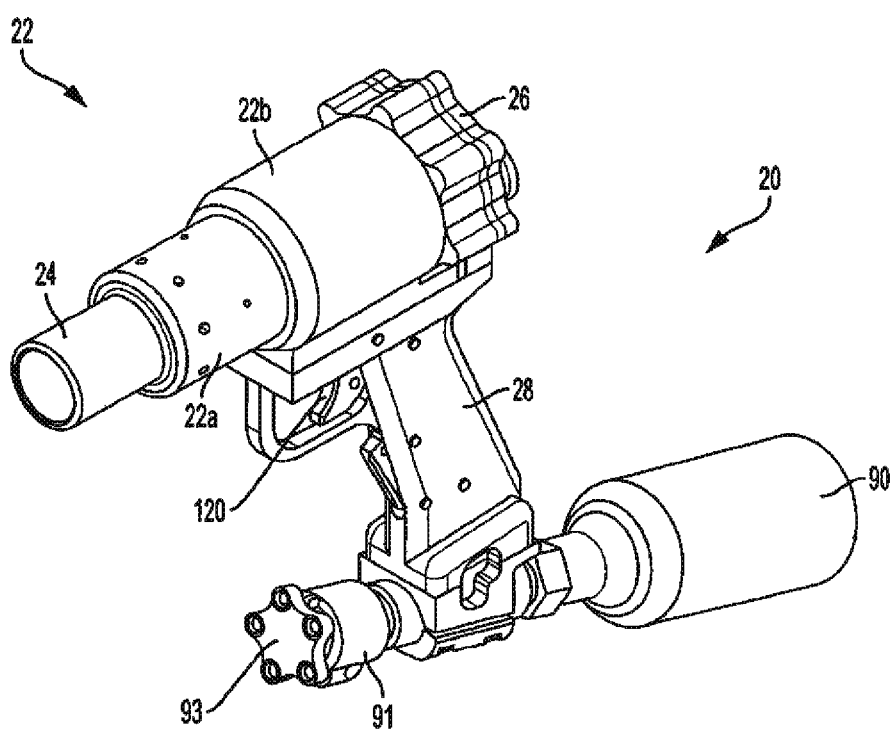
FIG. 41 is a perspective view of an embodiment of the stunner of the present invention employing a PSI regulator knob.
Figure 42:
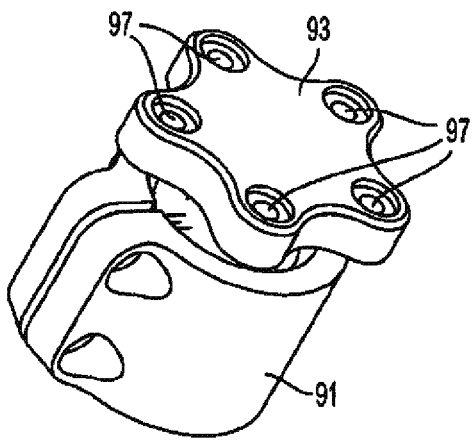
FIG. 42 is a perspective view of the PSI regulator knob, collar, and adjusting cap configuration employed in the embodiment of the stunner of FIG. 41.
Figure 43:
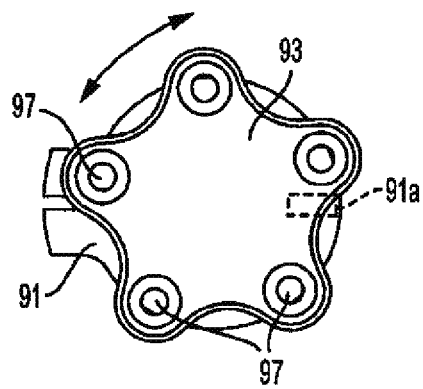
FIG. 43 is a top-down view of the PSI regulator knob, collar, and adjusting cap configuration of FIG. 42.
Figure 44:
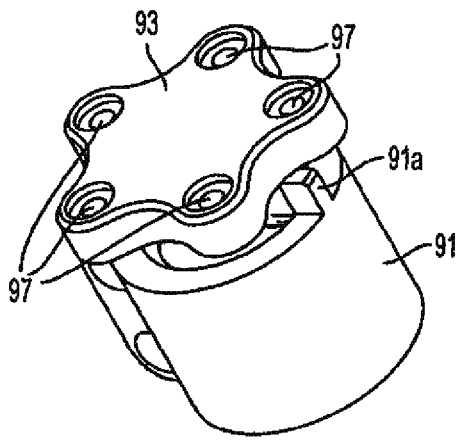
FIG. 44 is a perspective view of the PSI regulator knob, collar, and adjusting cap configuration of FIG. 42.
Figure 45:
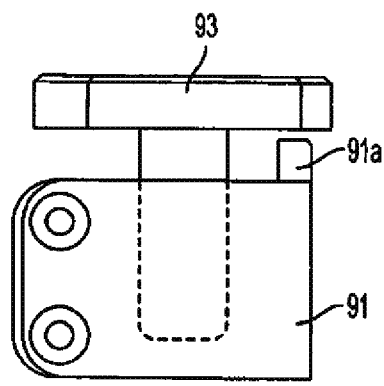
FIG. 45 is a side elevational view of the PSI regulator knob, collar, and adjusting cap configuration of FIG. 42.
Figure 46:
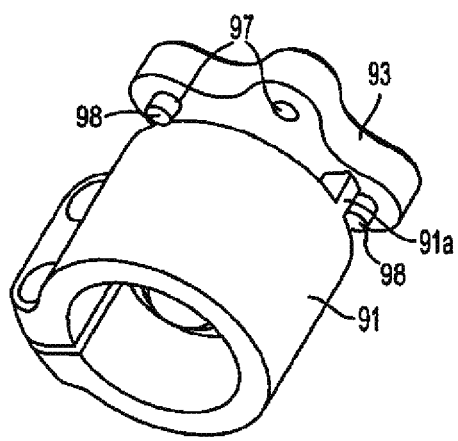
FIG. 46 is a bottom perspective view of the PSI regulator knob, collar, and adjusting cap configuration of FIG. 42.
Figure 47:
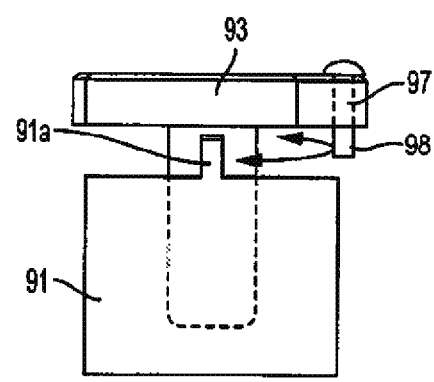
FIG. 47 is another side elevational view of the PSI regulator knob, collar, and adjusting cap configuration of FIG. 42.
Figure 48:
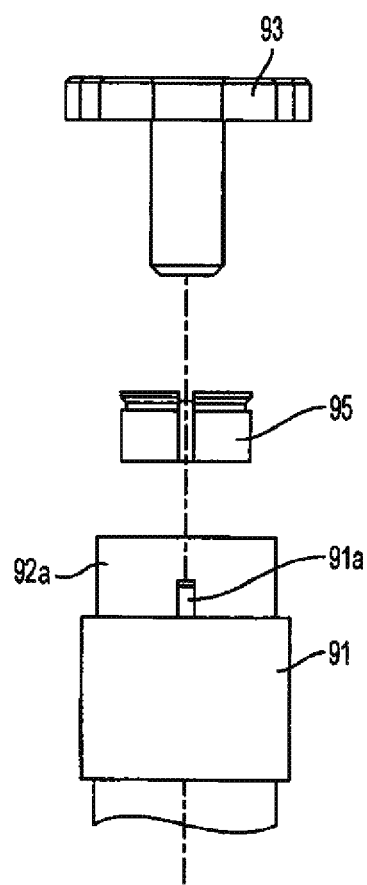
FIG. 48 is an exploded end view of the PSI regulator knob, collar, and adjusting cap configuration of FIGS. 42-47.

As shown in FIG. 8, stunner 20 may also be extended by depressing supply trigger 110 to permit pressurized fluid to flow into fire chamber 30, which pressure than exerts force against flange 21 at the rear end of housing front portion 22a. The housing continues forward until front housing flange 21 contacts O-ring cushion 23 seated against rear housing peripheral wall 29, as shown in FIG. 2.

The stunner of the present invention may have one or more of the following built-in safety features: 1) The fire chamber will not fill unless the catch release piston is in the hold position. This allows the stunner to be reset without having to worry about the fire chamber being charged accidentally and the rod fired. 2) The stunner will automatically return to full length once the supply trigger is pressed if the catch piston is in the hold position. Pressurized fluid pressure from the fill chamber presses on both halves 22a, 22b of the housing, extending them apart to the full length. This ensures that the stunning rod has full amount of travel once the stunner is charged and fired. 3) If at any time the supply trigger is released, the fire chamber is exhausted. This allows the stunner to be totally vented anytime the supply trigger is released. The stunner can be put away or set down and the operator does not have to worry about it being charged or have to remember to bleed off any of the pressurized fluid, and will help eliminate accidental firing of the stunner. This also makes for a two-part safety aspect for the stunner: a) The stunner will not fire unless the supply trigger has been pressed and stays pressed, then the fire trigger has to be pressed; and b) the stunner cannot fire if only one of the triggers has been pressed. They both have to be depressed to operate, i.e., fill the fire chamber and then fire the stunner.

The present invention therefore provides one or more of the following advantages: 1) an animal stunner in which the stunning rod is mechanically held under pressure and manually returned after stunning, providing more power and a better stun; 2) the use of dual triggers and automatic venting when the supply trigger is released results in safer handling and operation; 3) safeguards provided by architecture of the vents and passageways to reduce waste of pressurized fluid and enable the use of small tanks of compressed gas for maximum portability of the stunner and/or 4) permit an operator to limit and adjust pressure operation levels within a desired range.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of mounting a fluid regulator assembly to a portable pneumatic animal stunner for stunning an animal, comprising:
providing a portable stunner having a housing;
providing a handle disposed beneath the housing, the handle having a lower end and at least one passageway traversing through the length of the handle to the lower end for the passage of a fluid to the stunner;
providing a regulator for controlling the pressure of fluid provided to the stunner, the regulator having a body with opposing ends, the regulator first end adapted to receive a pressurized fluid container, the regulator second end having an adjustment knob for regulating the pressure of fluid from the pressurized fluid container, the regulator body having a passageway for passage of the regulated pressurized fluid from the fluid container to the regulator body;
aligning the regulator at least one passageway with the at least one passageway of the handle;
securing the regulator to the handle lower end; and
attaching the pressurized fluid container to the regulator body first end.

2. The method of claim 1 further including:
providing an adjusting cap;
inserting the adjusting cap within the regulator second end;
inserting the adjustment knob into the adjusting cap disposed within the regulator second end; and
adjusting the pressure of fluid provided to the stunner via the handle at least one passageway by rotating the adjustment knob within the regulator second end.

3. The method of claim 2 further providing:
providing a regulator collar having a tab protruding therewith;
providing at least one projection extending from the adjustment knob; and
disposing the regulator collar over the regulator second end;
wherein the minimum and maximum range of pressure of fluid supplied to the stunner is established by the rotational range of the adjustment knob, the rotational range of the knob being limited by contact interactions between the regulator collar tab and the at least one projection extending from the adjustment knob.

4. The method of claim 3, wherein the adjustment knob further provides at least one bore disposed about its periphery for receiving the at least one projection for limiting the rotational range of the adjustment knob.

5. The method of claim 3 wherein the pressurized fluid container, adjusting cap, regulator collar, and adjustment knob are installed in axial alignment with the regulator.

6. The method of claim 1 further including:
providing a supply valve disposed between the handle and the housing, wherein the handle at least one passageway connects to the supply valve to supply the regulated pressurized fluid flowing from the fluid tank through the regulator and handle at least one passageway.

7. The method of claim 1 wherein the adjustment knob is disposed in front of the handle upon installation into the regulator.

8. A method of regulating the pressure of a fluid received in a pneumatic animal stunner for stunning an animal, comprising:
providing a portable stunner having a housing;
providing a handle disposed beneath the housing, the handle having a lower end and at least one passageway traversing through the length of the handle to the lower end for the passage of a fluid to the stunner;
providing a regulator disposed on the handle lower end for controlling the pressure of fluid provided to the stunner, the regulator having a body with opposing ends, the regulator first end adapted to receive a pressurized fluid container, the regulator second end having an adjustment knob and a regulator collar disposed over the regulator second end, the adjustment knob for regulating the pressure of fluid from the pressurized fluid container, the regulator body having a passageway for passage of the regulated pressurized fluid from the fluid container to the first end of the regulator body;

providing at least one projection extending from one or the other or both of the regulator collar and/or adjustment knob for limiting rotational range of travel of the regulator adjustment knob, establishing a desired range with a minimum pressure of at least 15 PSI and a maximum pressure set by the rotational travel of the knob as limited by the projection; and rotating the adjustment knob to adjust the pressure levels of the fluid released from the fluid container into the at least one passageway of the handle within the established desired range.

9. The method of claim 8 further comprising:

providing a tab disposed on the regulator collar for limiting the rotational range of the adjustment knob;

providing at least one bore disposed about the periphery of the adjustment knob;

inserting the projection into the at least one bore in the adjustment knob; and wherein upon rotation of the adjustment knob the inserted projection makes contact with the regulator collar tab, preventing the adjustment knob from further rotation in the direction it is rotated and from increasing or decreasing the pressure levels of the fluid released from the fluid container.

10. The method of claim 8 further comprising:

providing a tab disposed on the regulator collar for limiting the rotational range of the adjustment knob;

providing a plurality of bores disposed about the periphery of the adjustment knob;

inserting a plurality of projections into the plurality of bores in the adjustment knob; and wherein upon rotation of the adjustment knob the inserted projections make contact with the regulator collar tab, decreasing the rotational range of the adjustment knob and preventing the adjustment knob from further rotation in the direction it is rotated and from increasing or decreasing the pressure levels of the fluid released from the fluid container.

11. The method of claim 8 further including:

providing a supply valve disposed between the handle and the housing, wherein the handle at least one passageway connects to the supply valve to supply the regulated pressurized fluid flowing from the fluid tank through the regulator and handle at least one passageway.

12. A method of regulating the pressure of a fluid received in a pneumatic animal stunner for stunning an animal, comprising:

providing a stunner having a housing;

providing a handle disposed beneath the housing, the handle having a lower end and at least one passageway traversing through the length of the handle to the lower end for the passage of a fluid to the stunner;

providing a regulator disposed on the handle lower end for controlling the pressure of fluid provided to the stunner, the regulator having a body with opposing ends, the regulator first end adapted to receive a pressurized fluid container, the regulator second end having an adjustment knob and a regulator collar disposed over the regulator second end, the adjustment knob for regulating the pressure of fluid from the pressurized fluid container, the regulator body having a passageway for passage of the regulated pressurized fluid from the fluid container to the first end of the regulator body;

providing a plurality of bores disposed about the periphery of the adjustment knob; and providing a tab disposed on the regulator collar for limiting the rotational range of the adjustment knob;

inserting a plurality of projections into the adjustment knob plurality of bores;

establishing a desired range with a minimum pressure of at least 15 PSI and a maximum pressure set by the rotational travel of the knob as limited by the plurality of projections and regulator collar tab; and rotating the adjustment knob to adjust the pressure levels of a fluid released from the fluid container into the at least one passageway of the handle within the established desired range.

13. The method of claim 12 further including installing the pressurized fluid container, adjusting cap, regulator collar, and adjustment knob in axial alignment with the regulator.

14. The method of claim 13 further providing the adjustment knob being disposed in front of the handle upon installation.

15. The method of claim 14 further including:

providing a supply valve disposed between the handle and the housing, wherein the handle at least one passageway connects to the supply valve to supply the regulated pressurized fluid flowing from the fluid tank through the regulator and handle at least one passageway.

16. A method of regulating the pressure of a fluid received in a pneumatic animal stunner for stunning an animal, comprising:

providing a stunner having a housing;

providing a handle disposed beneath the housing, the handle having a lower end and at least one passageway traversing through the length of the handle for the passage of a fluid to the stunner;

providing a regulator disposed on the handle lower end for controlling the pressure of fluid provided to the stunner, the regulator having a body with opposing ends, the regulator first end adapted to receive a pressurized fluid container, the regulator second end having an adjustment knob and a regulator collar disposed over the regulator second end, the adjustment knob for regulating the pressure of fluid from the pressurized fluid container, the regulator body having a passageway for passage of the regulated pressurized fluid from the fluid container to the first end of the regulator body;

providing a plurality of bores disposed about the periphery of the adjustment knob;

providing two projections for installation into the adjustment knob plurality of bores, the first of the two projections for establishing the maximum pressure of fluid released into the stunner, and the second of the two projections for establishing the minimum pressure of fluid released into the stunner; and providing a tab disposed on the regulator collar for limiting the rotational range of the adjustment knob;

inserting the two projections into the adjustment knob plurality of bores to establish the minimum and maximum pressures of fluid to be released into the stunner; and rotating the adjustment knob to adjust the pressure levels of a fluid released from the fluid container into the at least one passageway of the handle within a desired range established by the rotation travel of the knob as limited by the two projections and regulator collar tab.

17. The method of claim 16 further including installing the pressurized fluid container, adjusting cap, regulator collar, and adjustment knob in axial alignment with the regulator.

18. The method of claim 17 further providing the adjustment knob being disposed in front of the handle upon installation.

19. The regulator assembly of claim 17 wherein the at least one passageway of the regulator directly aligns with the at least one passageway of the handle upon securing the regulator to the handle lower end.

20. The method of claim 16 further including:
providing a supply valve disposed between the handle and the housing, wherein the handle at least one passageway connects to the supply valve to supply the regulated pressurized fluid flowing from the fluid tank through the regulator and handle at least one passageway.

21. A regulator assembly for regulating the pressure of a fluid received in a portable pneumatic animal stunner for stunning an animal, comprising:
a stunner having a housing;
a handle disposed beneath the housing, the handle having a lower end and at least one passageway traversing through the length of the handle for the passage of a fluid to the stunner;
a regulator disposed on the handle lower end for controlling the pressure of fluid provided to the stunner via the handle at least one passageway, the regulator having at least one passageway for the passage of fluid, the regulator further having opposing ends, the regulator first end adapted to receive a pressurized fluid container, the regulator second end adapted to receive an adjusting cap, regulator collar, and adjustment knob;
a projection extending from one or the other or both of the regulator collar and/or adjustment knob for limiting rotational range of travel of the regulator adjustment knob, and
wherein rotation of the adjustment knob adjusts the pressure levels of a fluid released from the fluid container into the at least one passageway of the handle via the regulator within a desired range established by the rotation travel of the knob as limited by the projection.

22. The regulator assembly of claim 21 wherein the fluid container, adjusting cap, regulator collar, and adjustment knob are in axial alignment with the regulator upon installation.

23. The regulator assembly of claim 22 wherein the adjustment knob is disposed in front of the handle upon installation.

24. The regulator assembly of claim 21 wherein the adjustment knob further includes at least one bore spaced about its periphery for receiving the projection.

25. The regulator assembly of claim 24 wherein the at least one bore of the adjustment knob may receive a plurality of projections for establishing the minimum and maximum range of pressure of fluid supplied to the stunner via the regulator.

26. The regulator assembly of claim 25 wherein the regulator collar further comprises a tab for limiting the rotational range of the adjustment knob via the plurality of projections.

27. A regulator assembly for regulating the pressure of a fluid received in a portable pneumatic animal stunner for stunning an animal, comprising:
a stunner having a housing;
a stunning rod mountable with a piston and moveable within an inner chamber in the stunner housing, the inner chamber having a catch for alternately holding and releasing the stunning rod, the rod further comprising:
an elongated body having a longitudinal axis, the elongated body having a forward end and an opposite rearward end, the forward end adapted to strike an animal's head, and the opposite rearward end adapted to receive an outwardly extending lip for engagement with the catch;
a handle disposed beneath the housing, the handle having a lower end and at least one passageway traversing through the length of the handle for the passage of a fluid to the stunner;
a regulator disposed on the handle lower end for controlling the pressure of fluid provided to the stunner via the handle at least one passageway, the regulator having at least one passageway for the passage of fluid, the regulator further having opposing ends, the regulator first end adapted to receive a pressurized fluid container, the regulator second end adapted to receive an adjusting cap, regulator collar, and adjustment knob;
a projection extending from one or the other or both of the regulator collar and/or adjustment knob for limiting rotational range of travel of the regulator adjustment knob, and
wherein rotation of the adjustment knob adjusts the pressure levels of a fluid released from the fluid container into the at least one passageway of the handle via the regulator within a desired range established by the rotation travel of the knob as limited by the projection.

28. The regulator assembly of claim 27 wherein the fluid container, adjusting cap, regulator collar, and adjustment knob are in axial alignment with the regulator upon installation.

29. The regulator assembly of claim 28 wherein the adjustment knob is disposed in front of the handle upon installation.

30. The regulator assembly of claim 27 wherein the adjustment knob further includes at least one bore spaced about its periphery for receiving the projection.

31. The regulator assembly of claim 30 wherein the at least one bore of the adjustment knob may receive a plurality of projections for establishing the minimum and maximum range of pressure of fluid supplied to the stunner via the regulator.

32. The regulator assembly of claim 31 wherein the regulator collar further comprises a tab for limiting the rotational range of the adjustment knob via the plurality of projections.

33. The regulator assembly of claim 27 wherein the at least one passageway of the regulator directly aligns with the at least one passageway of the handle upon securing the regulator to the handle lower end.

* * * * *

UNITED STATES PATENT AND TRADEMARK OFFICE
CERTIFICATE OF CORRECTION

PATENT NO. : 10,492,501 B2
APPLICATION NO. : 16/366439
DATED : December 3, 2019
INVENTOR(S) : Arthur Jones and Trent Jones It is certified that error appears in the above-identified patent and that said Letters Patent is hereby corrected as shown below:

In the Specification

In Column 11, Line 45, delete "CO2" and substitute therefore --$CO_2$--

In Column 14, Line 36, delete "CO2" and substitute therefore --$CO_2$--

Signed and Sealed this
Seventh Day of April, 2020

Andrei Iancu
*Director of the United States Patent and Trademark Office*